*(12)* United States Patent
Kawamura et al.

(10) Patent No.: US 12,468,594 B2
(45) Date of Patent: Nov. 11, 2025

(54) INFORMATION PROCESSING APPARATUS, INFORMATION PROCESSING METHOD, AND INFORMATION PROCESSING SYSTEM

(71) Applicants: Shintaro Kawamura, Kanagawa (JP); Shohichi Naitoh, Miyagi (JP); Shinya Iguchi, Kanagawa (JP)

(72) Inventors: Shintaro Kawamura, Kanagawa (JP); Shohichi Naitoh, Miyagi (JP); Shinya Iguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 60 days.

(21) Appl. No.: 18/164,767

(22) Filed: Feb. 6, 2023

(65) Prior Publication Data

US 2023/0281072 A1 Sep. 7, 2023

(30) Foreign Application Priority Data

Mar. 1, 2022 (JP) .................................. 2022-031184
Dec. 15, 2022 (JP) .................................. 2022-200077

(51) Int. Cl.
*G06F 11/07* (2006.01)
*G06F 16/21* (2019.01)

(52) U.S. Cl.
CPC ........ *G06F 11/079* (2013.01); *G06F 11/0775* (2013.01); *G06F 16/21* (2019.01)

(58) Field of Classification Search
CPC ..... G06F 11/079; G06F 16/21; G06F 11/0775
(Continued)

(56) References Cited

U.S. PATENT DOCUMENTS 6,744,266 B2 * 6/2004 Dor .................. H01L 22/20
257/E21.525
8,538,986 B2 * 9/2013 Bogart ............... G06F 16/58
707/805
(Continued)

FOREIGN PATENT DOCUMENTS

JP 5-298355 11/1993
JP 2007-066263 3/2007
(Continued)

*Primary Examiner* — Cam Linh T Nguyen
(74) *Attorney, Agent, or Firm* — IPUSA, PLLC

(57) ABSTRACT

An information processing apparatus, an information processing method, and an information processing system. The information processing apparatus is provided with one or more memories that store state information indicating a predetermined state of an object, identification information for an image or video that represents a mode of the predetermined state, and document information including a description describing the mode represented by the image or video, and circuitry that receives from the communication terminal, a search input, transmits to the communication terminal, first screen information of a search result list screen indicating an image or video identified by the identification information of the image or video stored with the state information specified based on the input, receives from the communication terminal, information for specifying an image or video selected by a user, generates description information including a description in the document information stored in association with identification information for the image or video, and transmits the description information to the communication terminal.

16 Claims, 20 Drawing Sheets

(58) Field of Classification Search
USPC .......................................................... 707/805
See application file for complete search history.

(56) References Cited

U.S. PATENT DOCUMENTS

| | | | |
|---|---|---|---|
| 2009/0287678 A1* | 11/2009 | Brown | G06F 16/3344 |
| | | | 707/999.005 |
| 2012/0041946 A1* | 2/2012 | Oka | G06F 16/5866 |
| | | | 707/E17.014 |
| 2014/0236649 A1* | 8/2014 | Hamid | G06Q 10/063 |
| | | | 705/7.11 |
| 2017/0017851 A1* | 1/2017 | Matsui | G06F 3/0488 |
| 2018/0157682 A1* | 6/2018 | Wakabayashi | G06F 18/22 |
| 2021/0195057 A1* | 6/2021 | Miyazaki | H04N 1/32625 |
| 2021/0294682 A1* | 9/2021 | Mills | G06N 20/00 |

FOREIGN PATENT DOCUMENTS

| | | |
|---|---|---|
| JP | 2019-020774 | 2/2019 |
| JP | 2020-077159 | 5/2020 |

\* cited by examiner

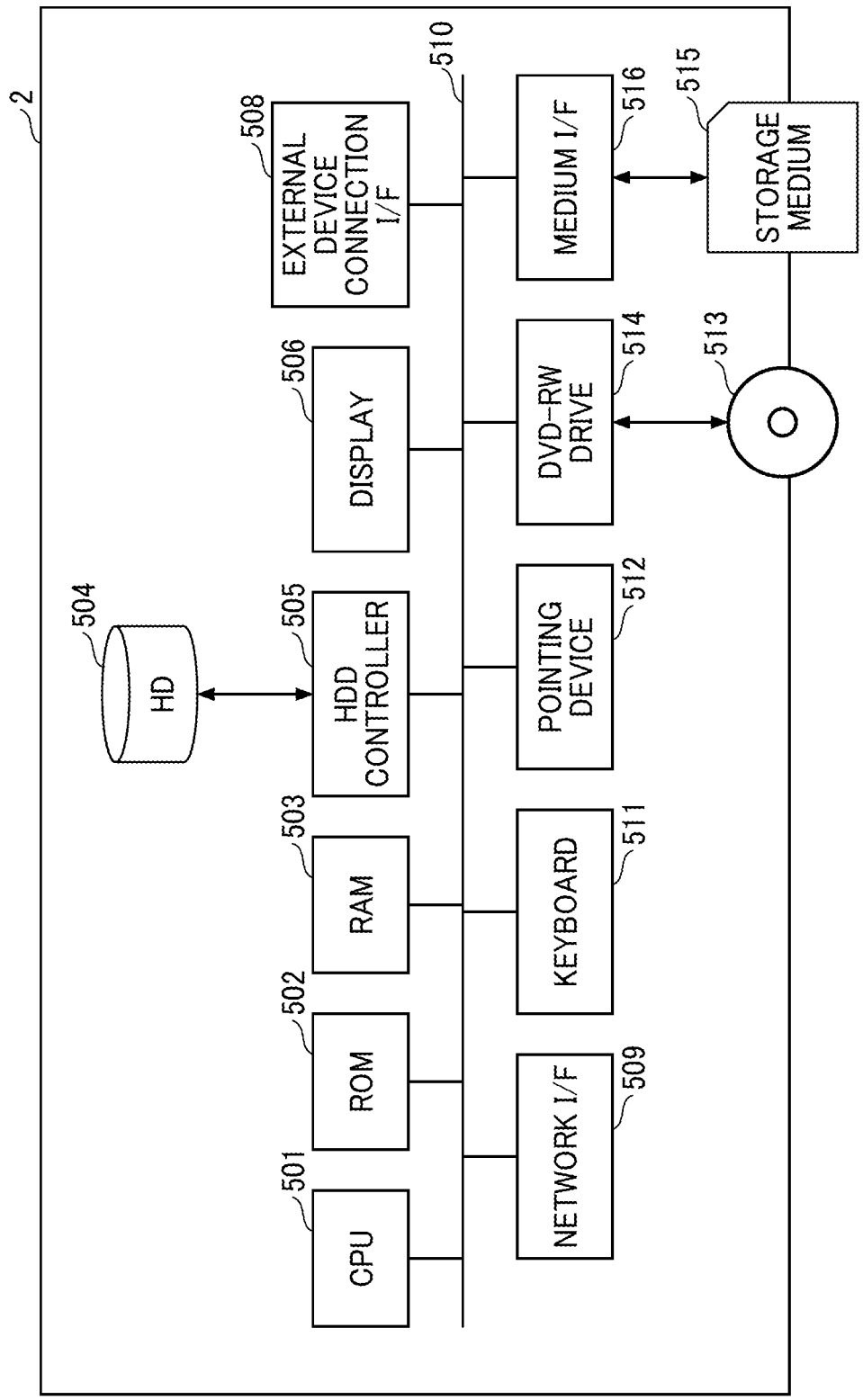

FIG. 4

| DATA NUMBER | PROBLEM | CAUSE | DOCUMENT NUMBER | PROBLEM DESCRIPTION START LINE | PROBLEM DESCRIPTION END LINE | CAUSE DESCRIPTION START LINE | CAUSE DESCRIPTION END LINE | IMAGE INFORMATION |
|---|---|---|---|---|---|---|---|---|
| 1 | VERTICAL LINE | A | 1 | 7 | 10 | 16 | 19 | pictA1.jpg |
| 2 | VERTICAL LINE | A | 5 | 12 | 15 | 20 | 23 | pictA2.jpg |
| 3 | VERTICAL LINE | A | 6 | 8 | 11 | 17 | 20 | pictA3.jpg |
| .. | .. | .. | .. | .. | .. | .. | .. | .. |
| 12 | VERTICAL LINE | A | 46 | 13 | 16 | 21 | 24 | pictA12.jpg |
| 13 | VERTICAL LINE | B | 4 | 6 | 9 | 15 | 18 | pictB1.jpg |
| 14 | VERTICAL LINE | B | 5 | 11 | 14 | 17 | 20 | pictB2.jpg |
| .. | .. | .. | .. | .. | .. | .. | .. | .. |
| 18 | VERTICAL LINE | B | 78 | 5 | 8 | 10 | 12 | pictB6.jpg |
| 19 | VERTICAL LINE | C | 31 | 9 | 12 | 15 | 18 | pictC1.jpg |
| 20 | VERTICAL LINE | C | 35 | 6 | 9 | 14 | 17 | pictC2.jpg |
| .. | .. | .. | .. | .. | .. | .. | .. | .. |
| 24 | VERTICAL LINE | C | 104 | 3 | 7 | 9 | 13 | pictC6.jpg |
| 25 | UNEVEN COLOR | E | 2 | 11 | 14 | 17 | 20 | pictE1.jpg |
| 26 | UNEVEN COLOR | E | 7 | 6 | 9 | 15 | 18 | pictE2.jpg |
| .. | .. | .. | .. | .. | .. | .. | .. | .. |

FIG. 5

| KEY (STATUS INFORMATION) | CAUSE (DESCRIPTION) | COUNTERMEASURE (DESCRIPTION) | IMAGE INFORMATION | THERAPEUTIC DRUG |
|---|---|---|---|---|
| # SWELLING OF SKIN<br># INSECT BITE<br># MOSQUITO | MOSQUITO BITE SYMPTOMS | IF YOU FEEL ITCHY, APPLY A WET TOWEL OR COLD WATER TO COOL THE AFFECTED AREA AND RELIEVE THE ITCHING. | MOSQUITO.JPG | [<br>{ "ID": 1, "NAME": "INSECT BITE OINTMENT", "URL": "HTTP://WWW.AAA.COM/A63157XXX" },<br>{ "ID": 2, "NAME": "INSECT BITE PLASTER", "URL": "HTTP://WWW.AAA.COM/A63220YY" }<br>] |
| # SWELLING OF SKIN<br># BURN<br># BLISTER | SKIN BURN SYMPTOMS | COOL THE AFFECTED AREA IMMEDIATELY WITH TAP WATER OR WET TOWEL. | BURN.JPG | [<br>{ "ID": 3, "NAME": "OINTMENT FOR BURNS", "URL": "HTTP://WWW.AAA.COM/X58732XX" }<br>] |
| # SWELLING OF SKIN<br># INSECT BITE<br># GNAT | GNAT BITE SYMPTOMS | RELEASE TOXINS FROM THE STING SITE. WRING OUT, WASH, AND WARM THE AFFECTED AREA. DO NOT COOL THE AFFECTED AREA. | GNAT.JPEG | [<br>{ "ID": 4, "NAME": "GNAT BITE SPRAY", "URL": "HTTP://WWW.AAA.COM/Z33123ZZ" }<br>] |
| # SWELLING OF SKIN<br># INSECT BITE<br># BEDBUG | BEDBUG BITE SYMPTOMS | APPLY TOPICAL ANTIHISTAMINE TO AFFECTED AREA. CONSULT DERMATOLOGIST IF ITCHING IS SEVERE. | BEDBUG.JPG | [<br>{ "ID": 5, "NAME": "BEDBUG BITE SPRAY", "URL": "HTTP://WWW.AAA.COM/C00123ZX" }<br>] |
| ... | ... | ... | ... | ... |

| KEY (STATUS INFORMATION) | CAUSE (DESCRIPTION) | COUNTERMEASURE (DESCRIPTION) | IMAGE INFORMATION | COUNTERMEASURE RELATED SITE |
|---|---|---|---|---|
| # SPOT<br># LEAF DISEASE<br># WHITE SPOT<br># CUCUMBER<br># MILDEW | MILDEW SYMPTOMS | REMOVE AFFECTED AREA TO PREVENT SPREAD. SYMPTOMS MAY SUBSIDE WHILE WHITE SPOTS ARE FEW. APPLY DEDICATED CHEMICALS OR NATURAL REMEDIES SUCH AS LIME. | MILDEW.JPG | [<br>{<br>"ID": 1,<br>"NAME": "MILDEW MEDICINE",<br>"URL": "HTTP://WWW.AAA.COM/A63157XXX"<br>},<br>{<br>"ID": 2,<br>"NAME": "ORGANIC LIME",<br>"URL": "HTTP://WWW.AAA.COM/A63220YY"<br>}<br>] |
| # SPOT<br># LEAF DISEASE<br># BLACK SPOT<br># CUCUMBER<br># BROWN SPOT | BROWN SPOT SYMPTOMS | PICK AND REMOVE AFFECTED AREA. SPRAYING CHEMICALS IS ALSO EFFECTIVE. | BROWN SPOT.JPG | [<br>{<br>"ID": 3,<br>"NAME": "GARDENING DISINFECTION SPRAY",<br>"URL": "HTTP://WWW.AAA.COM/X58732XX"<br>}<br>] |
| # LEAF DISEASE<br># CUCUMBER<br># MOSAIC DISEASE | MOSAIC DISEASE SYMPTOMS | PROMPTLY REMOVE AFFECTED LEAVES, STALKS, AND FRUITS AND DISPOSE IN PLASTIC BAG. GET RID OF PESTS. | MOSAIC DISEASE.JPG | [<br>{<br>"ID": 4,<br>"NAME": "PEST CONTROL SPRAY",<br>"URL": "HTTP://WWW.AAA.COM/Z33123ZZ"<br>}<br>] |
| : | : | : | : | : |

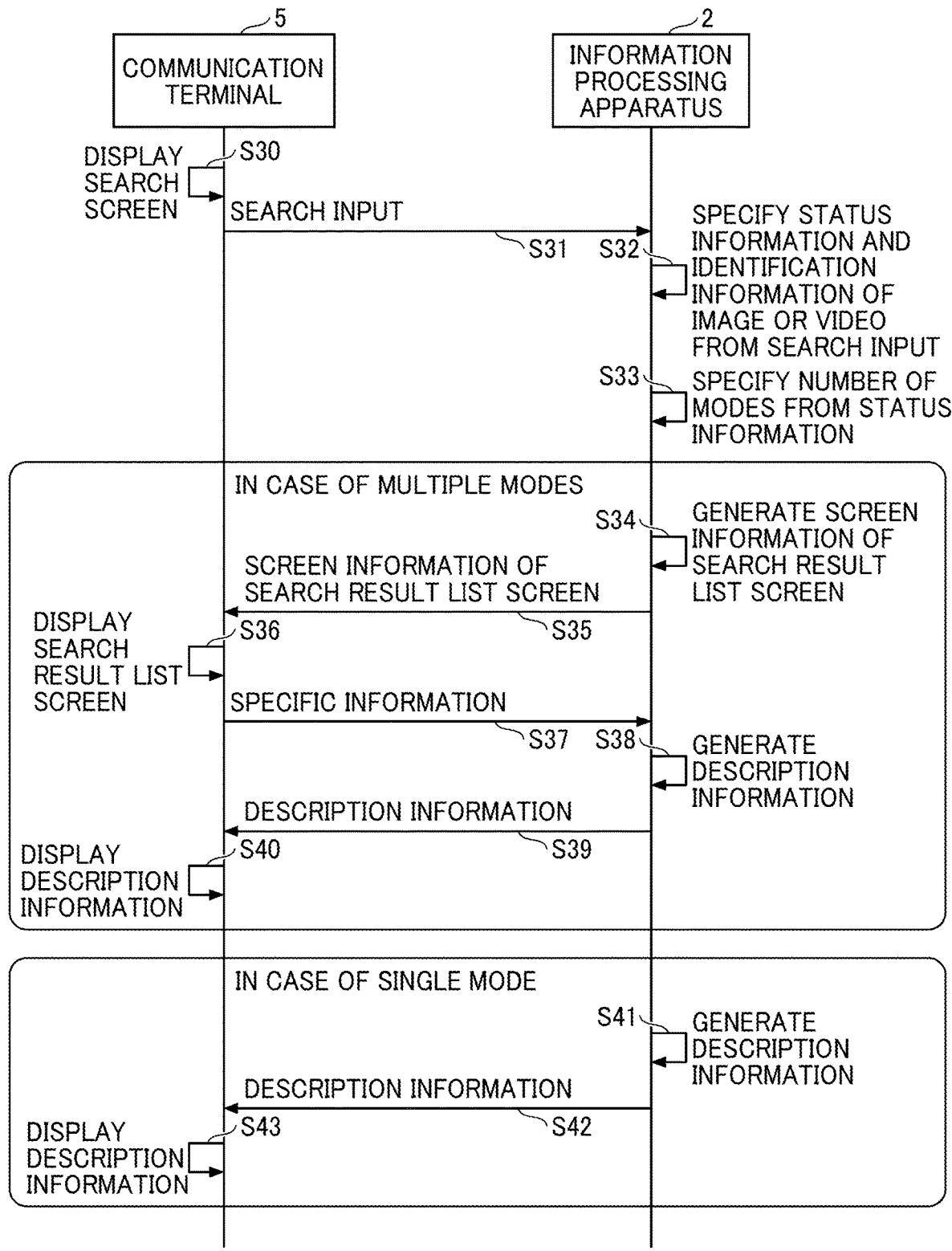

FIG. 17

Answer Screen

Please clean document holder, slit glass, or transfer roller.

| KEY (STATUS INFORMATION) | CAUSE (DESCRIPTION) | COUNTERMEASURE (DESCRIPTION) | SOUND INFORMATION | COUNTERMEASURE RELATED SITE |
|---|---|---|---|---|
| # NOISE<br># PAPER JAM | PAPER JAM | REMOVE JAMMED PAPER | SOUND1.MP4 | [<br>{"ID": 1,<br>"NAME": "USER MANUAL",<br>"URL": "HTTP://WWW.AAA.COM/A63157XXX"<br>}<br>] |
| # NOISE<br># ROLLER DEGRADATION OVER TIME | ROLLER DAMAGED | CHECK ROLLER | SOUND2.MP4 | [<br>{"ID": 2,<br>"NAME": "SERVICE MANUAL",<br>"URL": "HTTP://WWW.AAA.COM/A63220YY"<br>}<br>{"ID": 3,<br>"NAME": "SERVICE MANUAL",<br>"URL": "HTTP://WWW.AAA.COM/X58732XX"<br>}<br>] |
| # NOISE<br># HEATER DEGRADATION OVER TIME | HEATER DAMAGED | CONTACT WITH PROVIDER | SOUND3.MP4 | [<br>{"ID": 4,<br>"NAME": "CONTACT LIST",<br>"URL": "HTTP://WWW.AAA.COM/Z33123ZZ"<br>}<br>] |
| .. | .. | .. | .. | .. |

53

INFORMATION PROCESSING APPARATUS, INFORMATION PROCESSING METHOD, AND INFORMATION PROCESSING SYSTEM

CROSS-REFERENCE TO RELATED APPLICATIONS

This patent application is based on and claims priority pursuant to 35 U.S.C. § 119(a) to Japanese Patent Application No. 2022-031184, filed on Mar. 1, 2022, and Japanese Patent Application No. 2022-200077 filed on Dec. 15, 2022, in the Japan Patent Office, the entire disclosure of which is hereby incorporated by reference herein.

BACKGROUND

Technical Field

The present disclosure relates to an information processing apparatus, an information processing method, and an information processing system.

Related Art

A technique of searching for a malfunction of a device and obtaining search results such as a cause of the malfunction and measures to be taken is known.

In a conventional technique, when searching is performed for a predetermined state such as the malfunction of the device as a target, since a list of results related to the state is displayed as the search results in characters, users may face difficulty in specifying the desired search results from displayed characters.

SUMMARY

Embodiments of the present disclosure describe an information processing apparatus, an information processing method, and an information processing system. The information processing apparatus is provided with one or more memories that store, for each predetermined state of an object, state information indicating a predetermined state of the object, identification information for identifying an image or video that visually represents at least one mode of the predetermined state, and document information including a description describing the at least one mode represented by the information of the image or video in association with each other, and circuitry that receives from the communication terminal through the network, a search input entered at the communication terminal, transmits to the communication terminal through the network, first screen information of a search result list screen to be displayed in a selectable manner, the first screen information indicating an image or video identified by the identification information of the image or video stored in association with the state information specified based on the input, receives from the communication terminal through the network, specific information for specifying an image or video selected by a user from among the images or videos displayed in the selectable manner on the search result list screen, generates description information including a part or all of a description included in the document information stored in the one or more memories in association with identification information for identifying the image or video specified based on the specific information, and transmits the description information to the communication terminal through the network.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 2A is a block diagram illustrating an example of a hardware configuration of an information processing apparatus according to the embodiments of the present disclosure;

FIG. 4 is a diagram illustrating a first example of a database according to the embodiments of the present disclosure;

FIG. 5 is a diagram illustrating a second example of the database according to the embodiments of the present disclosure;

FIG. 6 is a diagram illustrating a third example of the database according to the embodiments of the present disclosure;

FIG. 7 is a sequence diagram illustrating an example of a search response process according to the embodiments of the present disclosure;

FIG. 17 is a diagram illustrating a fourth example of the answer screen according to the embodiments of the present disclosure;

FIG. 22 is a diagram illustrating a fourth example of the database according to the embodiments of the present disclosure;

Figure 1:
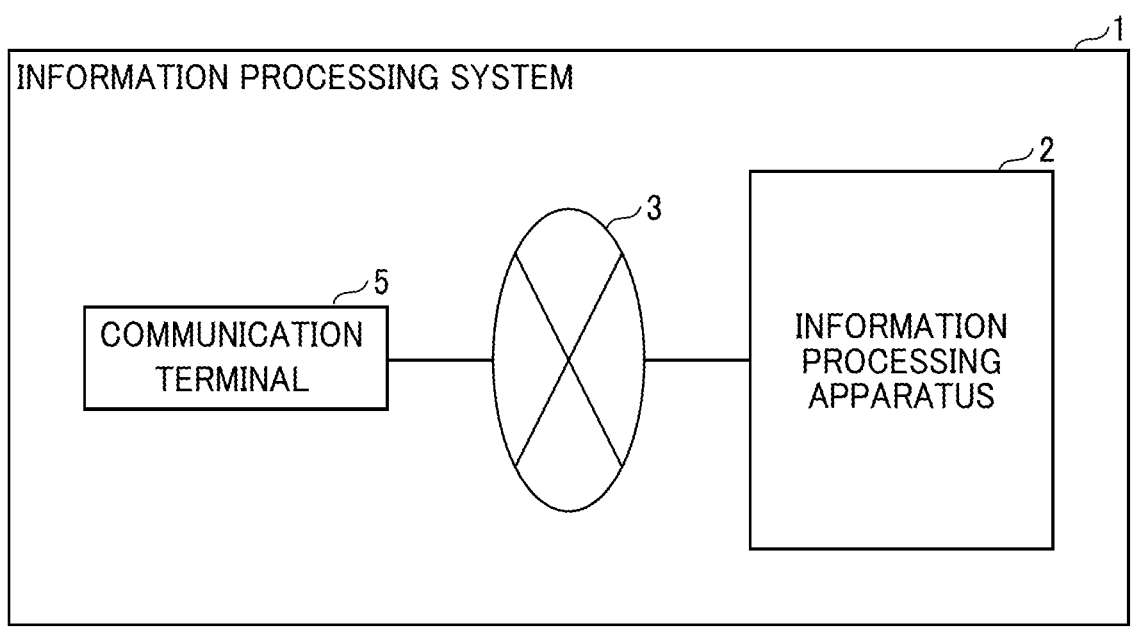
FIG. 1 is a schematic diagram illustrating an example of an information processing system according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a detailed description is given of several embodiments of an information processing apparatus, an information processing method, and a non-transitory storage medium, with reference to the accompanying drawings.

FIG. 1 is a schematic diagram illustrating an example of an information processing system according to the embodiments of the present disclosure. The information processing system 1 illustrated in FIG. 1 includes, for example, an information processing apparatus 2 and a communication terminal 5 connected to a communication network 3 such as the internet.

The information processing apparatus 2 stores state information indicating a predetermined state of an object, identification information for identifying an image, video, or sound that visually indicates a mode of the state information (hereinafter referred to as an image and the like), and text information including a description describing the mode in association with each other. For example, the object is an image forming apparatus, and the predetermined state is a state of malfunction in the image forming apparatus. Alternatively, the object may be a living thing, an action by a living thing, a natural phenomenon, a chemical phenomenon, an article, real estate, software, a device, an operation by a device, or the like. The information processing apparatus 2 receives search input entered by the user from the communication terminal 5 and transmits to the communication terminal 5, screen information of a search result list screen that displays image and the like associated with the state information specified by the received input so as to be selectable by the user. Further, the information processing apparatus 2 receives from the communication terminal 5, specific information for specifying the image or the like selected by the user from the images, or the like displayed on the search result list screen. Finally, the information processing apparatus 2 generates and transmits to the communication terminal 5, description information including a part or all of the description included in document information stored in association with identification information for identifying the image, or the like specified based on the received specific information.

The communication terminal 5 transmits the search input entered by the user to the information processing apparatus 2, and displays the search result list screen on a display based on the screen information of the search result list screen received from the information processing apparatus 2. The communication terminal 5 further transmits to the information processing apparatus 2, the specific information for specifying the image or the like selected by the user from the images or the like displayed on the search result list screen, and displays on the display, the description information received from the information processing apparatus 2.

As a result, in the information processing system 1, in response to the search input by the user, a search result desired by the user from the search result list by the image, video, or sound can be confirmed.

Note that the system configuration of the information processing system 1 illustrated in FIG. 1 is an example. For example, the communication network 3 may include a network such as a local area network (LAN), or a connection through wireless communication such as mobile communication or wireless LAN.

Further, although one communication terminal 5 is included in the information processing system 1 in the example of FIG. 1, the number of communication terminals 5 included in the information processing system 1 may be any number. In addition, in the example of FIG. 1, the communication terminal 5 transmits the search input to the information processing apparatus 2 by text, but the present disclosure is not limited to this configuration. For example, the information processing apparatus 2 may receive the search input by the user from an input device or the like included in the information processing apparatus 2. In this case, the information processing apparatus 2 does not communicate with the communication terminal 5.

FIG. 2A is a block diagram illustrating an example of a hardware configuration of the information processing apparatus 2 according to the present embodiment. As illustrated in FIG. 2, the information processing apparatus 2 is implemented by a computer including a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, a digital versatile disc-rewritable (DVD-RW) drive 514, and a medium I/F 516.

The CPU 501 controls overall operation of the information processing apparatus 2. The ROM 502 stores a control program such as an initial program loader (IPL) to boot the CPU 501. The RAM 503 is used as a work area for the CPU 501. The HD 504 stores various data such as programs. The HDD controller 505 controls reading and writing of various data from and to the HD 504 under control of the CPU 501.

The display 506 displays various information such as a cursor, menu, window, character, or image. The external device connection I/F 508 is an interface for connecting various external devices. Examples of the external devices include, but are not limited to, a universal serial bus (USB) memory and a printer. The network I/F 509 is an interface that controls communication of data with the external device through the communication network 3. The bus line 510 is the address bus, the data bus, or the like for electrically connecting each component such as the CPU 501 illustrated in FIG. 2A.

The keyboard 511 is an example of an input device including a plurality of keys used for inputting characters, numerical values, various instructions, and the like. The pointing device 512 is another example of the input device that allows a user to select or execute a specific instruction, select a target for processing, or move a cursor being displayed. The DVD-RW drive 514 reads and writes various data from and to a DVD-RW 513, which is an example of a removable storage medium. The removable storage medium is not limited to the DVD-RW and may be a digital versatile disc-recordable (DVD-R) or the like. The medium I/F 516 controls reading and writing (storing) of data from and to a storage medium 515 such as a flash memory.

Figure 2B:
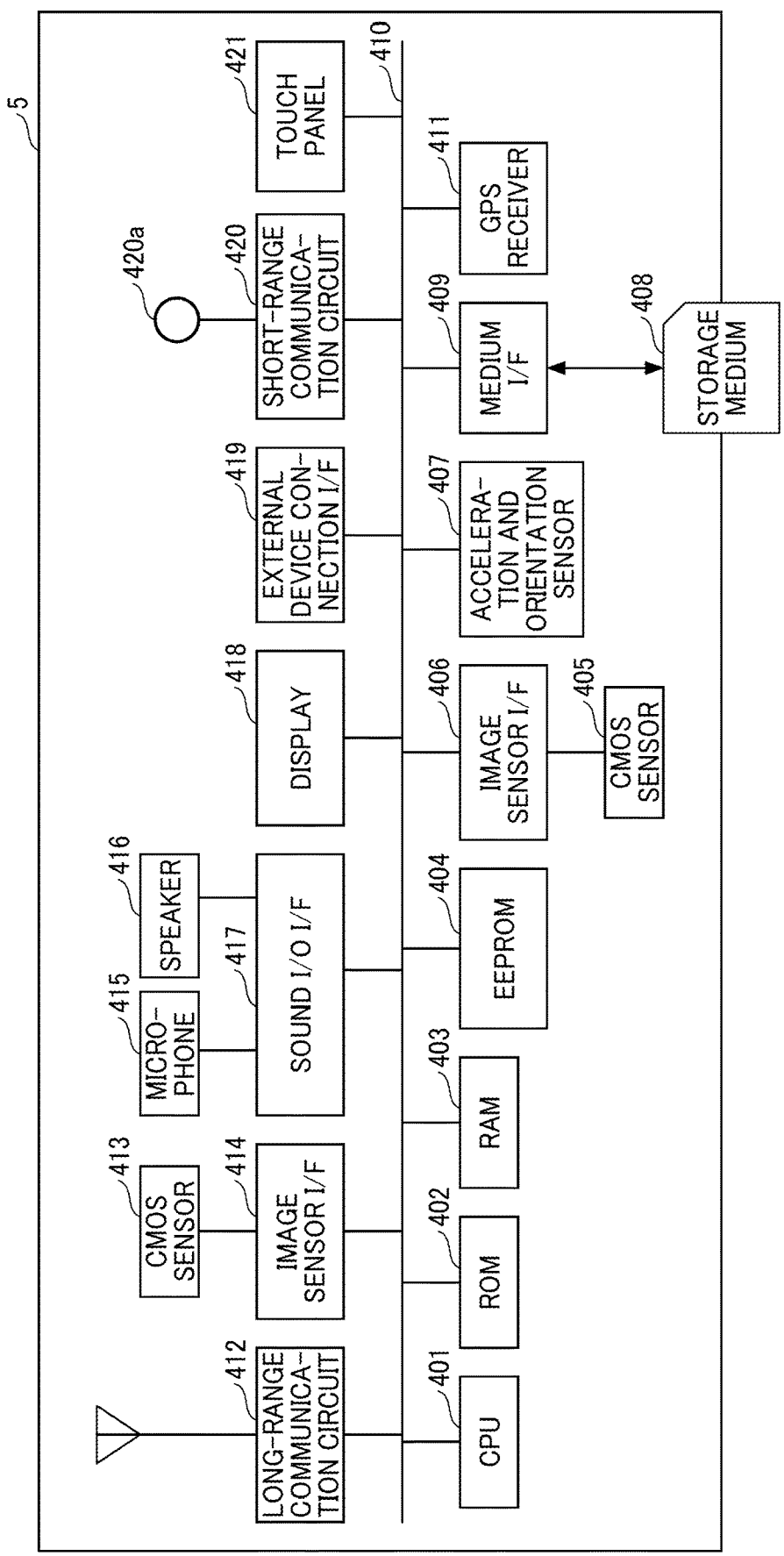
FIG. 2B is a block diagram illustrating an example of the hardware configuration of the communication terminal according to the embodiments of the present disclosure.

FIG. 2B is a block diagram illustrating an example of the hardware configuration of the communication terminal 5 according to the present embodiment. As illustrated in FIG. 2B, the communication terminal 5 includes a CPU 401, a ROM 402, a RAM 403, an electrically erasable and programmable ROM (EEPROM) 404, a complementary metal oxide semiconductor (CMOS) sensor 405, an image sensor I/F 406, an acceleration and orientation sensor 407, a medium I/F 409 and a Global Positioning System (GPS) receiver 411.

The CPU 401 controls the operation of the entire communication terminal 5. The ROM 402 stores a program such as an initial program loader (IPL) to boot the CPU 401. The RAM 403 is used as a work area for the CPU 401. The EEPROM 404 reads or writes various data such as the programs under the control of the CPU 401. The CMOS sensor 405 is an example of a built-in imaging device configured to capture an object (mainly, a self-image of a user) under the control of the CPU 401 to obtain image data. In alternative to the CMOS sensor, an imaging element such as a charge-coupled device (CCD) sensor may be used. The image sensor I/F 406 is a circuit that controls a drive of the CMOS sensor 405. The acceleration and orientation sensor 407 includes various sensors such as an electromagnetic compass for detecting geomagnetism, a gyrocompass, and an acceleration sensor. The medium I/F 409 controls reading or writing (storage) of data from or to a storage medium 408 such as a flash memory. The GPS receiver 411 receives a GPS signal from a GPS satellite.

In addition, the communication terminal 5 includes a long-range communication circuit 412, a CMOS sensor 413, an image sensor I/F 414, a microphone 415, a speaker 416, a sound input/output (I/O) I/F 417, a display 418, an external device connection I/F 419, a short-range communication circuit 420, an antenna 420a of the short-range communication circuit 420, and a touch panel 421.

The long-range communication circuit 412 is a circuit that enables communication with other device through the communication network 3. The CMOS sensor 413 is an example of a built-in imaging device configured to capture a subject under control of the CPU 401 to obtain image data. The image sensor I/F 414 is a circuit that controls the drive of the CMOS sensor 413. The microphone 415 is a built-in circuit that converts a sound into an electric signal. The speaker 416 is a built-in circuit that generates the sound such as music or voice by converting an electric signal into physical vibration. The sound I/O I/F 417 is a circuit that processes sound signal input and output between the microphone 415 and the speaker 416 under the control of the CPU 401. The display 418 is an example of a display device configured to display an image of the object, various icons, etc. Examples of the display 418 include, but not limited to, a liquid crystal display (LCD) and an organic electroluminescence (EL) display. The external device connection I/F 419 is an interface for connecting various external devices. The short-range communication circuit 420 is a communication circuit that communicates in compliance with the Near Field Communication (NFC), the BLUETOOTH (Registered Trademark), and the like. The touch panel 421 is one example of an input device that allows the user to operate the communication terminal 5 by touching a screen of the display 418.

The communication terminal 5 further includes a bus line 410. The bus line 410 is an address bus or a data bus, which electrically connects the elements in FIG. 4 such as the CPU 401.

In the present embodiment, regarding the hardware configuration of the information processing apparatus 2 and the communication terminal 5, the information processing apparatus 2 is assumed to be a general computer, and the communication terminal 5 is assumed to be a portable terminal such as a smartphone, but the present embodiment is not limited to this configuration. The information processing apparatus 2 and the communication terminal 5 may have the same hardware configuration.

Figure 3:
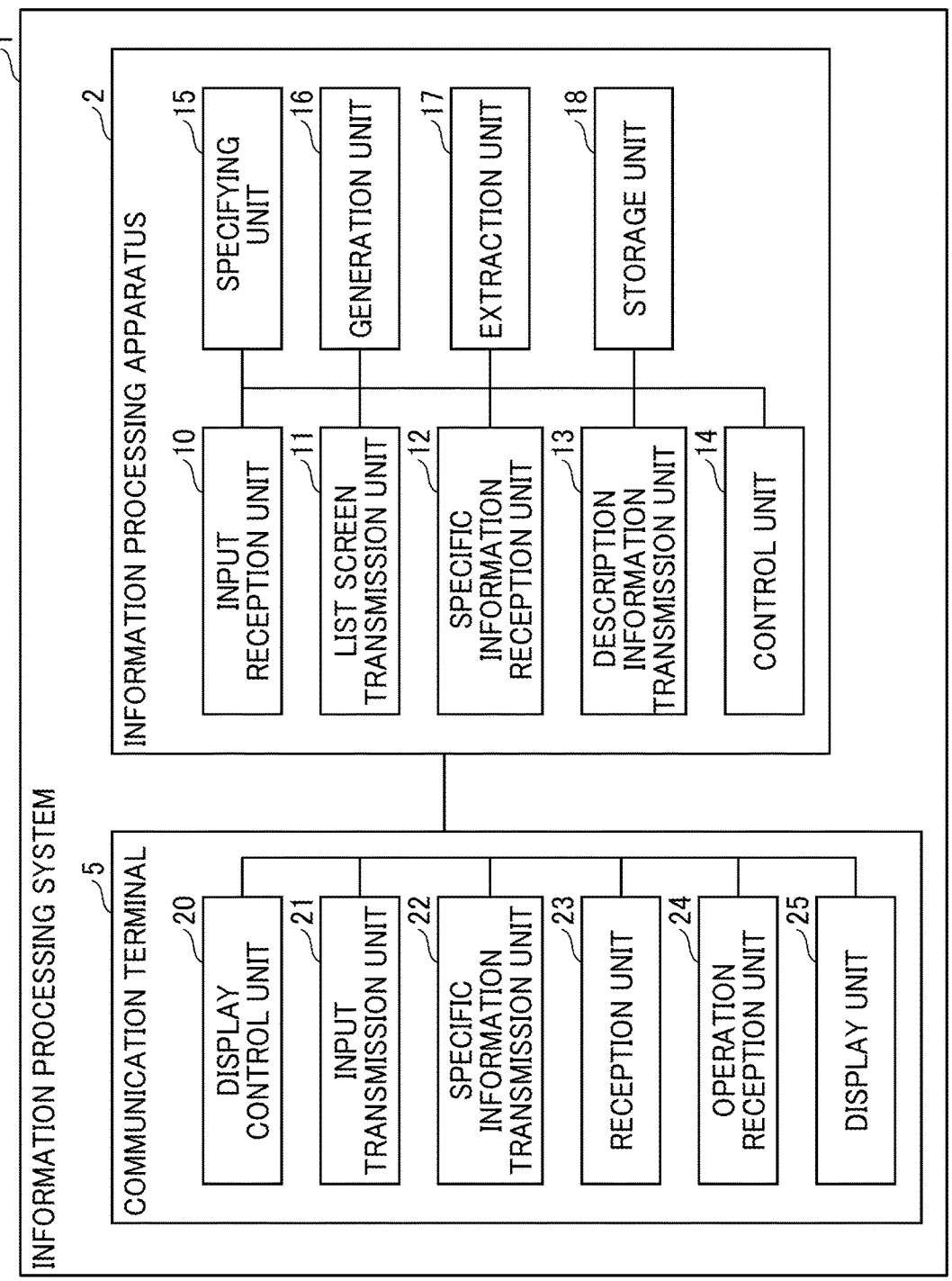
FIG. 3 is a block diagram illustrating an example of a functional configuration of the information processing system according to the embodiments of the present disclosure.

FIG. 3 is a block diagram illustrating an example of a functional configuration of the information processing system according to the present embodiment. The information processing apparatus 2 includes an input reception unit 10, a list screen transmission unit 11, a specific information reception unit 12, a description information transmission unit 13, a control unit 14, a specifying unit 15, a generation unit 16 and an extraction unit 17. These units are functions implemented by the CPU 501 executing instructions included in one or more programs installed in the information processing apparatus 2. The storage unit 18 is implemented by, for example, a storage device such as the HD 504 included in the information processing apparatus 2, or a storage device connected to the information processing apparatus 2, or the like.

The input reception unit 10 receives a search input entered by the user from the input transmission unit 21 of the communication terminal 5 through the communication network 3.

The list screen transmission unit 11 transmits the screen information of the search result list screen generated by the generation unit 16 to the reception unit 23 of the communication terminal 5 through the communication network 3.

The specific information reception unit 12 receives the specific information for specifying the image or video selected by the user from the specific information transmission unit 22 of the communication terminal 5 through the communication network 3.

The description information transmission unit 13 transmits the screen information including the description information generated by the generation unit 16 to the reception unit 23 of the communication terminal 5 through the communication network 3.

The control unit 14 controls processing executed by the information processing apparatus 2.

The specifying unit 15 searches the storage unit 18 of the information processing apparatus 2 based on the search input received by the input reception unit 10, and specifies the state information indicating a predetermined state of the object. Specifically, the specifying unit 15 searches a database stored in the storage unit 18 to specify the state information. The database stored in the storage unit 18 is a database to be searched. In the present embodiment, the storage unit 18 may store any one of databases 50, 51, 52, and 53. Details of the databases 50, 51, 52, and 53 are described below.

For example, the specifying unit 15 extracts a keyword from the search input, and uses the value of the item that includes the extracted keyword as the state information in the items indicating the state information in the databases 50, 51, 52, and 53. Further, the specifying unit 15 specifies identification information (for example, file names) of the image, video, or sound stored in the databases 50, 51, 52, and 53, described below, related to the specified state information. The specifying unit 15 further specifies the number of modes in the state information.

The generation unit 16 generates the screen information of the search result list screen that displays image, video, or sound specified by the specification information specified by the specifying unit 15 in a reproducible and selectable manner. The generation unit 16 further generates the description information.

Specifically, based on the specific information received by the specific information reception unit 12, the generation unit 16 identifies the identification information for identifying the image, video, or sound, and generates the description using the document information stored in association with the identification information in the storage unit 18. Accordingly, the description may be a part of the document information stored in the storage unit 18 in association with the image, video, or sound specified by the specific information. The details of the method of generating the description is described below. In addition, the generation unit 16 generates screen information for a description screen for displaying the description information.

In the case a plurality of images or videos are stored in the storage unit 18 in association with the state information, the extraction unit 17 classifies a plurality of images or videos with a similarity higher than a threshold into the same group and extracts one image or video per group.

The storage unit 18 stores, for example, the state information indicating a predetermined state for each predetermined state of the object searched by the user, the identification information for identifying the image, video, or sound representing at least one mode of a given state, and the document information including the description describing the at least one mode represented by the image, video, or sound information in association with each other. In other words, the storage unit 18 stores the state information, the identification information, and the document information in a storage device such as the HD 504 of the information processing apparatus 2, or a storage device connected to the information processing apparatus 2, or the like.

The communication terminal 5 includes a display control unit 20, an input transmission unit 21, a specific information transmission unit 22, a reception unit 23, an operation reception unit 24 and a display unit 25. These units are functions implemented by the CPU 501 executing instructions included in one or more programs installed in the communication terminal 5.

Based on the screen information received from the information processing apparatus 2, the display control unit 20 causes the display unit 25 to display the search result list screen, the description information about the search results, and the like. The screen information is, for example, web content data to be displayed by a web browser application or an application including a web browser function.

The input transmission unit 21 transmits the search input received by the operation reception unit 24 to the input reception unit 10 of the information processing apparatus 2 through the communication network 3.

The specific information transmission unit 22 transmits the specific information for specifying the image or video selected by the user to the specific information reception unit 12 of the information processing apparatus 2 through the communication network 3.

The reception unit 23 receives the screen information of the search result list screen from the list screen transmission unit 11 of the information processing apparatus 2 through the communication network 3. Further, the reception unit 23 receives the screen information including the description information from the description information transmission unit 13 of the information processing apparatus 2 through the communication network 3.

The operation reception unit 24 receives operations such as character input and button depression by the user through the keyboard and pointing device of the communication terminal 5. For example, the operation reception unit 24 receives the search input by the user and an operation of the user selecting the image, video, or sound corresponding to the mode related to the search input.

The display unit 25 displays, on the display 506 of the communication terminal 5, the search result list screen, the description information about the search result, and the like in accordance with an instruction from the display control unit 20.

The details of the database stored in the storage unit 18 of the information processing apparatus 2 is described in the following. FIG. 4 is a diagram illustrating a first example of the database according to the embodiments of the present disclosure. The information to be searched stored in the database 50 of FIG. 4 includes data number, problem, cause, document number, problem description start line, problem description end line, and image information as information items. In the database 50, the item "data number" is associated with other items.

The value of the item "data number" is a number for identifying each row of data in the database 50.

The value of the item "problem" is the state information indicating the predetermined state of the object such as the image forming apparatus. For example, in the case the database 50 is a database relating to maintenance of the image forming apparatus, failure phenomena that may occur in the target image forming apparatus are indicated.

The value of the item "cause" is information indicating the document information indicating the mode in the predetermined state. For example, for a failure that can occur due to the predetermined state indicated by the value of the item "problem", the cause is specified from the description of the document information corresponding to the value of the item "document number". Here, the values of the item "cause" are expressed using pre-classified symbols (A, B, C, and the like). That is, in the database 50, the cause is classified into the same cause (cause A) in the data whose predetermined state is "vertical line" (the values of the item "data number" is "1" to "12"). Similarly, the causes are classified into the same cause (cause B and cause C) for the values of the item "data number" of "13" to "18" and "19" to "24".

Note that in the present embodiment, text data associated with the symbol of the value of the item "cause" may be stored in the storage unit 18.

Specifically, the value "A" of the item "cause" may be stored in association with text data "a document holder, a slit glass, and a transfer roller is dirty." Further, the value "B" of the item "cause" may be stored in association with text data "Because residual toner is not removed due to blade failure, white lines will occur." Also, the value "C" of the item "cause" may be stored in association with text data "because the roller of the document feeder is dirty, lines occur."

The text data associated with the value of the item "cause" may be used for generating the description, which is described below.

The value of the item "document number" is a number specifying the document information including the description related to the value of the item "problem" and the value of the item "cause".

The value of the item "problem description start line" indicates a first line number where the content related to the value of the item "problem" is described in the document indicated by the document information specified by the value of the item "document number".

The value of the item "problem description end line" indicates a last line number where the content related to the value of the item "problem" is described in the document indicated by the document information specified by the value of the item "document number".

The value of the item "cause description start line" indicates a first line number where the content related to the value of the item "cause" is described in the document indicated by the document information specified by the value of the item "document number".

The value of the item "cause description end line" indicates a last line number of the location where the content related to the value of the item "cause" is described in the document indicated by the document information specified by the value of the item "document number".

The value of the item "image information" is information indicating the identification information for identifying the image that visually represents the value of the item "problem" or an obstacle that may occur due to the value of the item "problem".

The value of the item "problem" and the value of the item "cause" may be manually extracted from the document identified by the document number, or may be automatically extracted from the document identified by the document number.

Hereinafter, a description is given of a second example of the database. FIG. 5 is a diagram illustrating a second example of the database according to the embodiments of the present disclosure. The information to be searched stored in the database 51 of FIG. 5 includes key, cause, countermeasure, image information, and therapeutic drug as information items.

The value of the item "key" is the state information indicating the predetermined state of the object (skin), and includes keywords relating to the state of the skin, such as "insect bite" and "burn".

The value of the item "cause" is information indicating the document information indicating the mode in the predetermined state indicated by the value of the item "key", and includes description of the cause of the mode, for example, "mosquito bite symptoms."

The value of the item "countermeasure" is information indicating the document information indicating the mode in the predetermined state indicated by the value of the item "key", and includes the description of the countermeasure for the mode.

The value of the item "image information" is information indicating the identification information for identifying the image visually representing the mode of the predetermined state indicated by the value of the item "key", and is the file name of the image file in this example.

The value of the item "therapeutic drug" includes information indicating a uniform resource locator (URL) for linking to a website that provides or sells a therapeutic drug, which is a product used to improve the predetermined condition indicated by the value of the item "key".

Hereinafter, a description is given of a third example of the database. FIG. 6 is a diagram illustrating the third example of the database according to the embodiments of the present disclosure. The information to be searched stored in the database 52 of FIG. 6 includes key, cause, countermeasure, image information, and countermeasure related site as the information items.

The value of the item "key" is the state information indicating the predetermined state of the object (leaf disease), and includes, for example, keywords relating to the state of leaf disease such as "spot" and "powdery mildew".

The value of the item "cause" is information indicating the document information indicating the mode in the predetermined state indicated by the value of the item "key", and includes the description for describing the cause for the mode such as "symptom of powdery mildew."

The value of the item "countermeasure" is information indicating the document information indicating the mode in the predetermined state indicated by the value of the item "key", and includes the description of the countermeasure for the mode.

The value of the item "image information" is information indicating the identification information for identifying the image visually representing the mode of the predetermined state indicated by the value of the item "key", and is the file name of the image file in this example.

The value of the item "countermeasure-related site" is information on products used to improve the predetermined state indicated by the value of the item "key", such as information indicating the URL for linking to website that provides or sells medicines that are used to deal with leaf diseases.

FIG. 7 is a sequence diagram illustrating an example of a search response process according to the embodiments of the present disclosure. In this sequence diagram, a process in which the information processing apparatus 2 responds to the search input entered by the user by operating the communication terminal 5 is described. The process of each step in FIG. 7 is described below.

Figure 8:
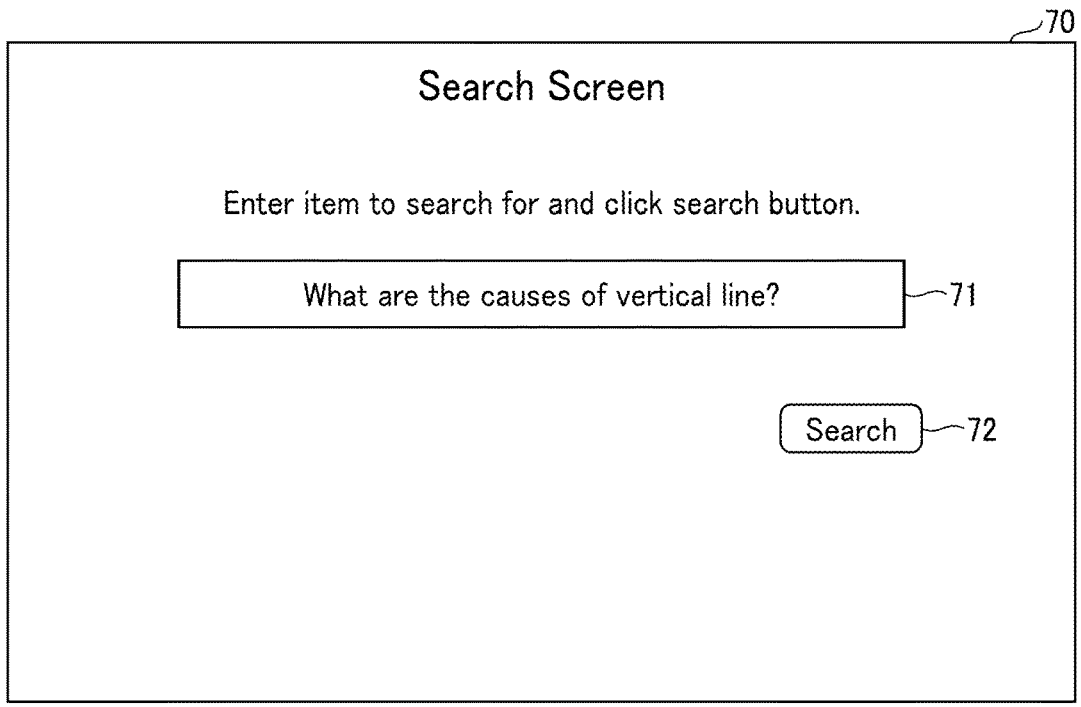
FIG. 8 is a diagram illustrating a first example of the search screen according to the embodiments of the present disclosure.

In step S30, the display control unit 20 of the communication terminal 5 causes the display unit 25 of the communication terminal 5 to display a search screen. The operation reception unit 24 of the communication terminal 5 receives the search input by the user. The search input is, for example, a natural sentence or keyword. FIG. 8 is a diagram illustrating a first example of the search screen according to the embodiments of the present disclosure. The search screen 70 in FIG. 8 is a screen displayed in step S30. A search input field 71 and a search button 72 are displayed on the search screen 70.

The search input field 71 is a field in which the user enters the search input by characters, words, sentences, and the like. In the example of FIG. 8, "What are the causes of vertical line?" is entered as the search input.

The search button 72 is a button for the user to press for starting the search after completing search input.

Figure 9:
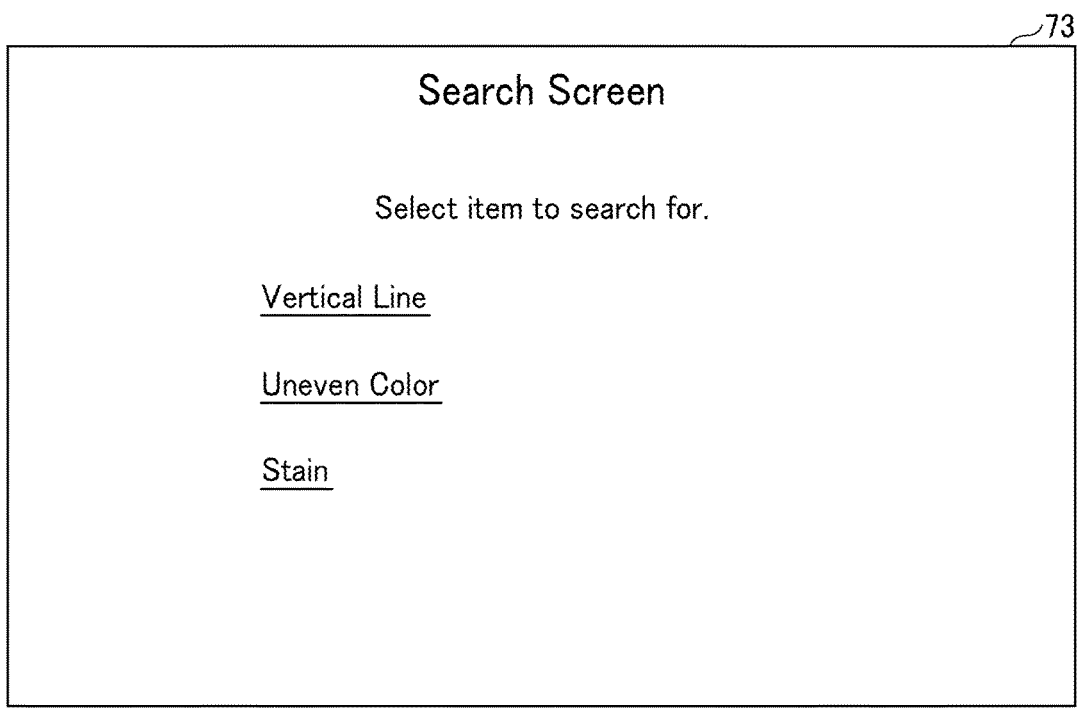
FIG. 9 is a diagram illustrating a second example of the search screen according to the embodiments of the present disclosure.

Furthermore, an example of another search screen is described in the following. FIG. 9 is a diagram illustrating a second example of the search screen according to the embodiments of the present disclosure. The search screen 73 in FIG. 9 is a screen displayed in step S30. The search screen 73 displays "vertical line," "uneven color," and "spot" as candidates of the search input to be selected by the user. The user executes the search by pressing a location on the screen where the candidate to be searched is displayed. In other words, the search input for a given state is received through the search screen 70 on which the state information indicating the given state is displayed in a selectable manner.

Figure 10:
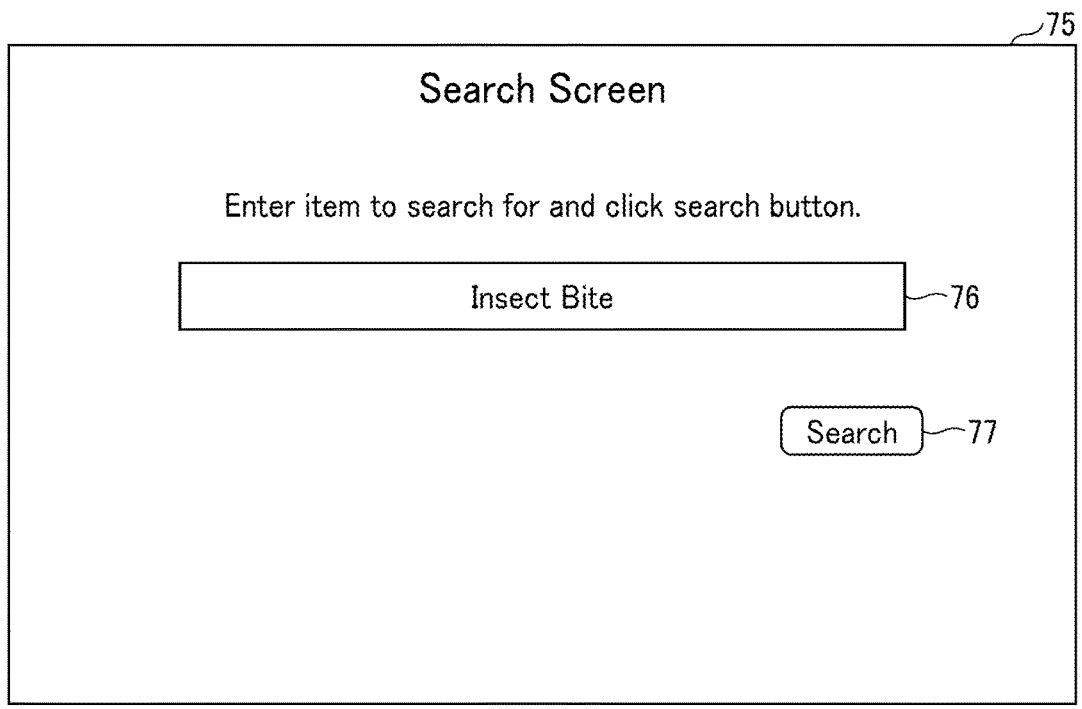
FIG. 10 is a diagram illustrating a third example of the search screen according to the embodiments of the present disclosure.

Furthermore, an example of another search screen is described in the following. FIG. 10 is a diagram illustrating a third example of the search screen according to the embodiments of the present disclosure. The search screen 75 in FIG. 10 is the screen displayed in step S30. A search input field 76 and a search button 77 are displayed on the search screen 75.

The search input field 76 is a field in which the user enters the search input by characters, words, sentences, and the like. In the example of FIG. 10, "insect bite" is entered as the search input.

The search button 77 is a button for the user to press for starting the search after completing search input.

Figure 11:
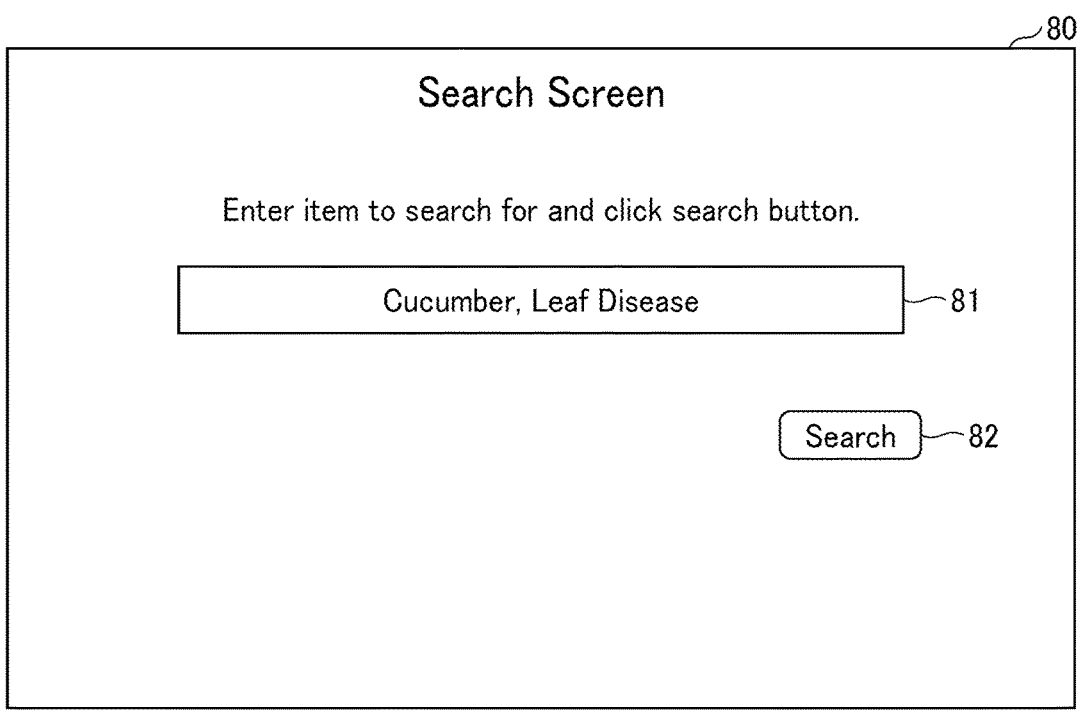
FIG. 11 is a diagram illustrating a fourth example of the search screen according to the embodiments of the present disclosure.

Furthermore, an example of another search screen is described in the following. FIG. 11 is a diagram illustrating a fourth example of the search screen according to the embodiments of the present disclosure. The search screen 80 in FIG. 11 is the screen displayed in step S30. The search input field 81 and the search button 82 are displayed on the search screen 80.

The search input field 81 is a field in which the user enters the search input by characters, words, sentences, and the like. In the example of FIG. 10, "cucumber leaf disease" is entered as the search input.

The search button 82 is a button for the user to press for starting the search after completing search input.

Returning to FIG. 7, description continues.

In step S31, the input transmission unit 21 of the communication terminal 5 transmits the search input received by the operation reception unit 24 to the input reception unit 10 of the information processing apparatus 2. The input reception unit 10 of the information processing apparatus 2 receives the search input entered by the user from the input transmission unit 21 of the communication terminal 5.

In step S32, the specifying unit 15 of the information processing apparatus 2 specifies the state information stored in the storage unit 18 of the information processing apparatus 2 based on the search input received by the input reception unit 10. For example, in response to the search input "what are the causes of vertical line?" entered in the search input field 71 of the search screen 70 of FIG. 8, the specifying unit 15 searches the database 50 to specify data in which the value (state information) of the item "problem" includes "vertical line". The value of the item "problem" is the state information.

Similarly, when "vertical line" is selected as a search input on the search screen 73 of FIG. 9, the specifying unit 15 searches the database 50 of FIG. 4, and specifies the data that includes "vertical line" in the value of the item "problem".

Further, for example, in response to the search input "insect bite" entered in the search input field 76 of the search screen 75 of FIG. 10, the specifying unit 15 searches the database 51 to specify the data including "insect bite" in the value (state information) of the item "key".

Further, for example, in response to the search input "cucumber leaf disease" entered in the search input field 81 of the search screen 80 of FIG. 11, the specifying unit 15 searches the database 52 to specify the data including "cucumber" and "leaf disease" in the value (state information) of the item "key".

Furthermore, the specifying unit 15 specifies the identification information (for example, file names) of the image or video related to the specified state information stored in the storage unit 18. In the case multiple images or videos related to the state information are stored in the storage unit 18, the extraction unit 17 classifies a plurality of images or videos having similarities higher than a threshold into the same group, and extracts one image or video for each group. For calculating the degree of similarity, for example, a calculation formula is set in which feature vectors are calculated from image data, and the smaller the distance between the vectors, the higher the degree of similarity. The specifying unit 15 uses the identification information of the image or video related to the state information as the identification information of the image or video extracted by the extraction unit 17.

In step S33, the specifying unit 15 of the information processing apparatus 2 specifies the number of modes in the state information specified in step S32.

For example, in step S32, when the specifying unit 15 specifies the value of the item "problem" in the database 50 of FIG. 4 as the state information, since the value of the item "problem" in the database 50 is "vertical line" and the value of the item "cause" in the database 50 is three types (A, B, C), the specifying unit 15 specifies the number of modes as three.

Further, for example, in step S32, in the case the specifying unit 15 specifies the value of the item "key" that includes "insect bite" as the state information in the database 51 of FIG. 5, since there are three values of the item "cause" in the database 51 corresponding to the value of the item "key" in the database 51 including "insect bite", the specifying unit 15 specifies the number of modes as three.

Further, for example, in step S32, in the case the specifying unit 15 specifies the value of the item "key" that includes "cucumber" and "leaf disease" as the state information, in the database 52 of FIG. 6, the specifying unit 15 specifies the number of modes as three, since the number of values of the item "cause" corresponding to the value of the item "key" including "cucumber" and "leaf disease" is three.

The control unit 14 of the information processing apparatus 2 shifts the process to step S34 when there are a plurality of modes specified by the specifying unit 15, and shifts the process to step S41 when there is one mode.

In step S34, the generation unit 16 of the information processing apparatus 2 generates the screen information of the search result list screen that selectively displays the image or video identified by the identification information specified by the specifying unit 15 in step S32.

In step S35, the list screen transmission unit 11 of the information processing apparatus 2 transmits the screen information of the search result list screen generated by the generation unit 16 in step S34 to the reception unit 23 of the communication terminal 5.

Figure 12:
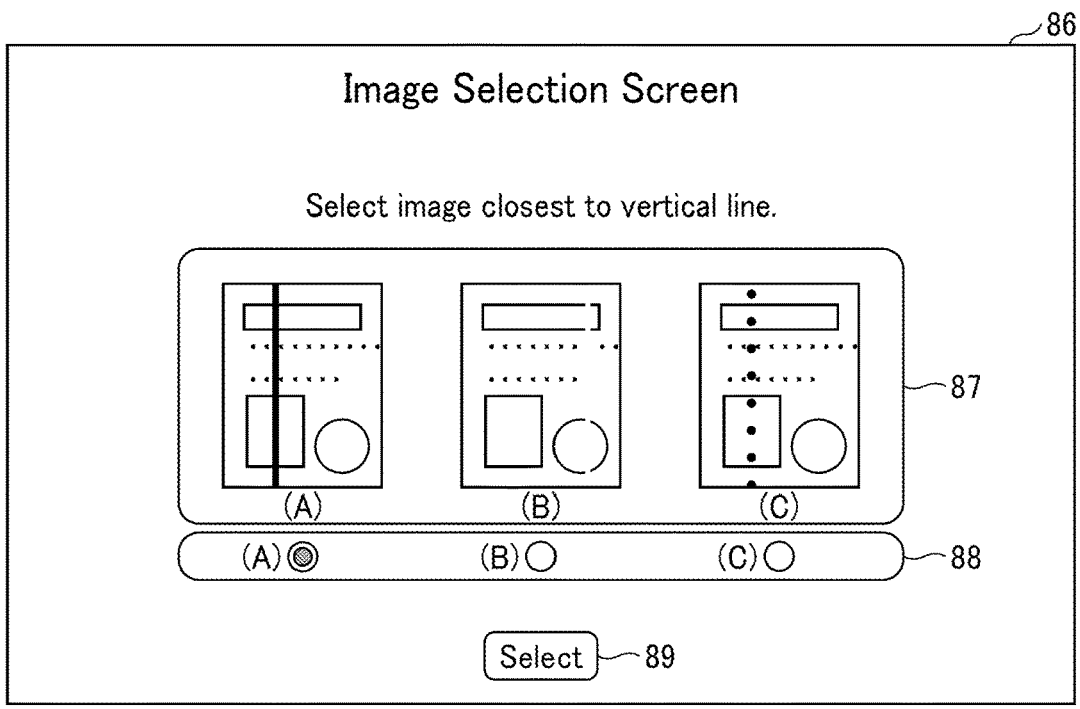
FIG. 12 is a diagram illustrating a first example of an image selection screen according to the embodiments of the present disclosure.

In step S36, the display control unit 20 of the communication terminal 5 causes the display unit 25 of the communication terminal 5 to display the search result list screen (an image selection screen) based on the screen information received by the reception unit 23 of the communication terminal 5. FIG. 12 is a diagram illustrating a first example of the image selection screen according to the embodiments of the present disclosure. The image selection screen 86 of FIG. 12 is, in other words, the search result list screen, which is displayed on the display unit 25 in step S36. The image selection screen 86 includes an image display area 87, selection buttons 88 and a select button 89.

In the image display area 87, the value "vertical line" of the item "problem" in the database 50 of FIG. 4 and the images corresponding to three types (A, B, and C) of modes as values of the item "cause" specified by the specifying unit 15 in step S32 are displayed.

The selection buttons 88 are buttons for the user to select the image corresponding to the mode of the search input.

The select button 89 is a button to be pressed for the user to select an image by pressing the selection buttons 88 and then instructs to select the image.

Figure 13:
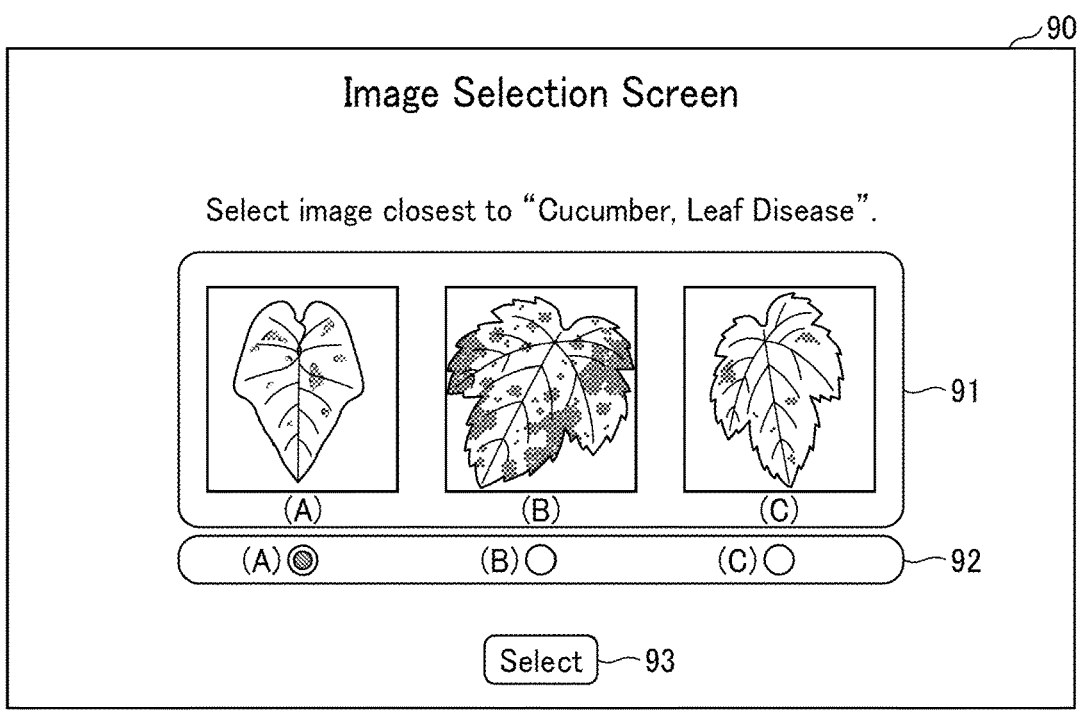
FIG. 13 is a diagram illustrating a second example of the image selection screen according to the embodiments of the present disclosure.

Hereinafter, a description is given of an example of another image selection screen. FIG. 13 is a diagram illustrating a second example of the image selection screen according to the embodiments of the present disclosure. The image selection screen 90 in FIG. 13 is the screen displayed in step S36. The image selection screen 90 includes the image display area 91, the selection buttons 92 and the select button 93.

In the image display area 91, images corresponding to three modes, which are the values of the item "cause" in the database 52 corresponding to the values of the item "key" in the database 52 of FIG. 6 including "cucumber" and "leaf disease", specified by the specifying unit 15 in step S32 are displayed.

The selection buttons 92 are the buttons for the user to select the image corresponding to the mode related to the search input.

The select button 93 is a button to be pressed for the user to select the image by pressing one of the selection buttons 92 and then instructs to select the image.

The operation reception unit 24 of the communication terminal 5 receives an operation of the user selecting the image or video corresponding to the mode related to the search input.

In step S37, the specific information transmission unit 22 of the communication terminal 5 transmits the specific information specifying the image or video selected by the user to the specific information reception unit 12 of the information processing apparatus 2. The specific information reception unit 12 of the information processing apparatus 2 receives the specific information specifying the image or video selected by the user from the specific information transmission unit 22 of the communication terminal 5.

In step S38, the generation unit 16 of the information processing apparatus 2 generates the description information including the description included in the document information based on the specific information received by the specific information reception unit 12.

Hereinafter, a description is given of a method for creating the description. The generation unit 16 refers to the database 50 and acquires the value of the item "cause" corresponding to the state information and the identification information of the image or video specified in step S32. Then, the generation unit 16 generates the description by applying the text data indicated by the acquired value of the item "cause" to a template prepared in advance. Note that the template may be stored in the generation unit 16.

Specifically, for example, when the value (state information) of the item "problem" is "vertical line" and the text data indicated by the value of the item "cause" is "toner stains", by applying this text data to the template prepared in advance, "the cause is XX", the description "the cause is toner stains" is generated. Alternatively, in the present embodiment, the description may be generated by inputting the text data indicated by the value of the item "cause" into a language model (such as the Encoder-Decoder model often used in natural language processing) that converts the text data into a natural sentence expression.

In addition, the generation unit 16 generates screen information for a description screen for displaying the description information. Here, on the description screen, the generation unit 16 generates the screen information so that among the sentences or words displayed in the search input display, the sentences or words related to the state information and the sentences or words having a causal relationship may be indicated by a symbol. Furthermore, the generation unit 16 may generate the screen information so that the sentences or words related to the state information included in the description and the sentences or words having the causal relationship are indicated by the symbol on the description screen, among the sentences or words displayed in the description information display. How to find causality is described below.

In step S39, the description information transmission unit 13 of the information processing apparatus 2 transmits the screen information including the description information generated by the generation unit 16 in step S38 to the reception unit 23 of the communication terminal 5.

Figure 14:
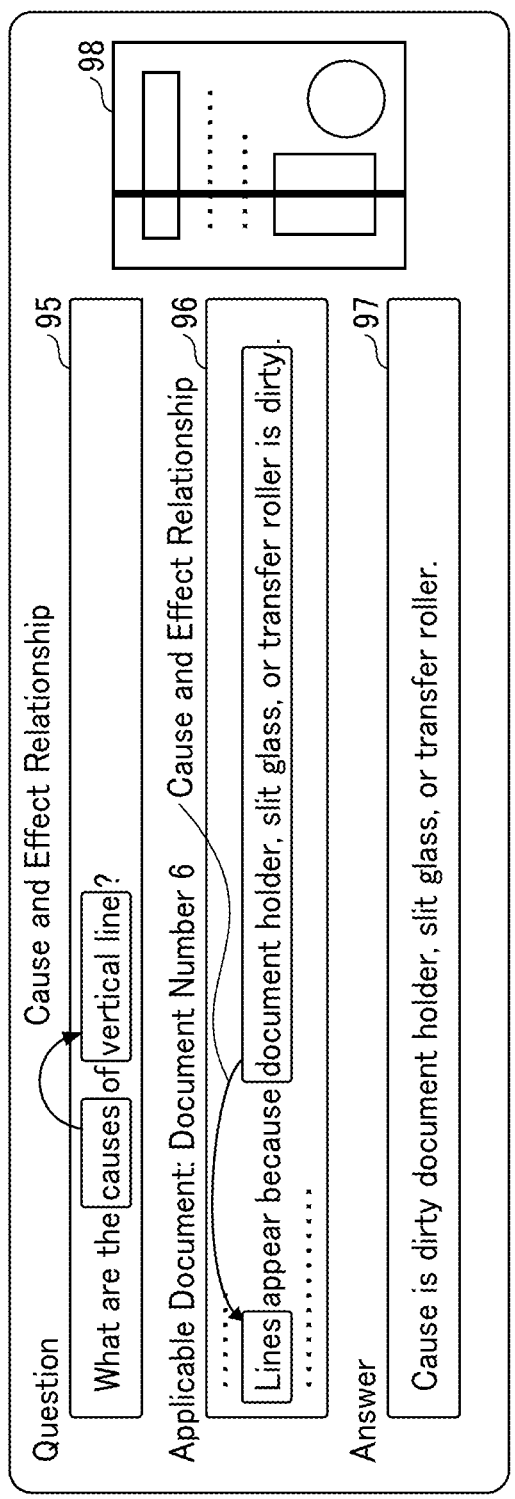
FIG. 14 is a diagram illustrating a first example of an answer screen according to the embodiments of the present disclosure.

In step S40, the display control unit 20 of the communication terminal 5 causes the display unit 25 of the communication terminal 5 to display the description information on an answer screen for the search input based on the screen information received by the reception unit 23 of the communication terminal 5. FIG. 14 is a diagram illustrating a first example of the answer screen according to the embodiments of the present disclosure. The answer screen 94 in FIG. 14 is the screen displayed in step S40. The answer screen 94 includes a question display field 95, a document display field 96, an answer display field 97 and a related image 98.

The question display field 95 is a field for displaying the search input received by the input reception unit 10 of the information processing apparatus 2 in step S30. Here, as described in step S38, the symbols indicating causal relationships (rectangles surrounding sentences or words and arrows connecting the rectangles) are displayed. For example, the symbols may be displayed by analyzing an intention of text data, which is a search input, and identifying words having causal relationship.

The document display field 96 is a field for displaying the document information referred to when generating the description for the search input. Here, the symbols (rectangles enclosing sentences or words and arrows connecting the rectangles) for indicating the causal relationship between the problem ("line") and the cause ("document holder, slit glass, transfer roller is dirty") are also displayed. Here, for example, the value of the item "problem" and the value of the item "cause" in the database 50 may be determined to have a causal relationship in advance.

The answer display field 97 is a field for displaying the description generated by the generation unit 16 as the answer to the search input.

The related image 98 is an image related to the description.

Figure 15:
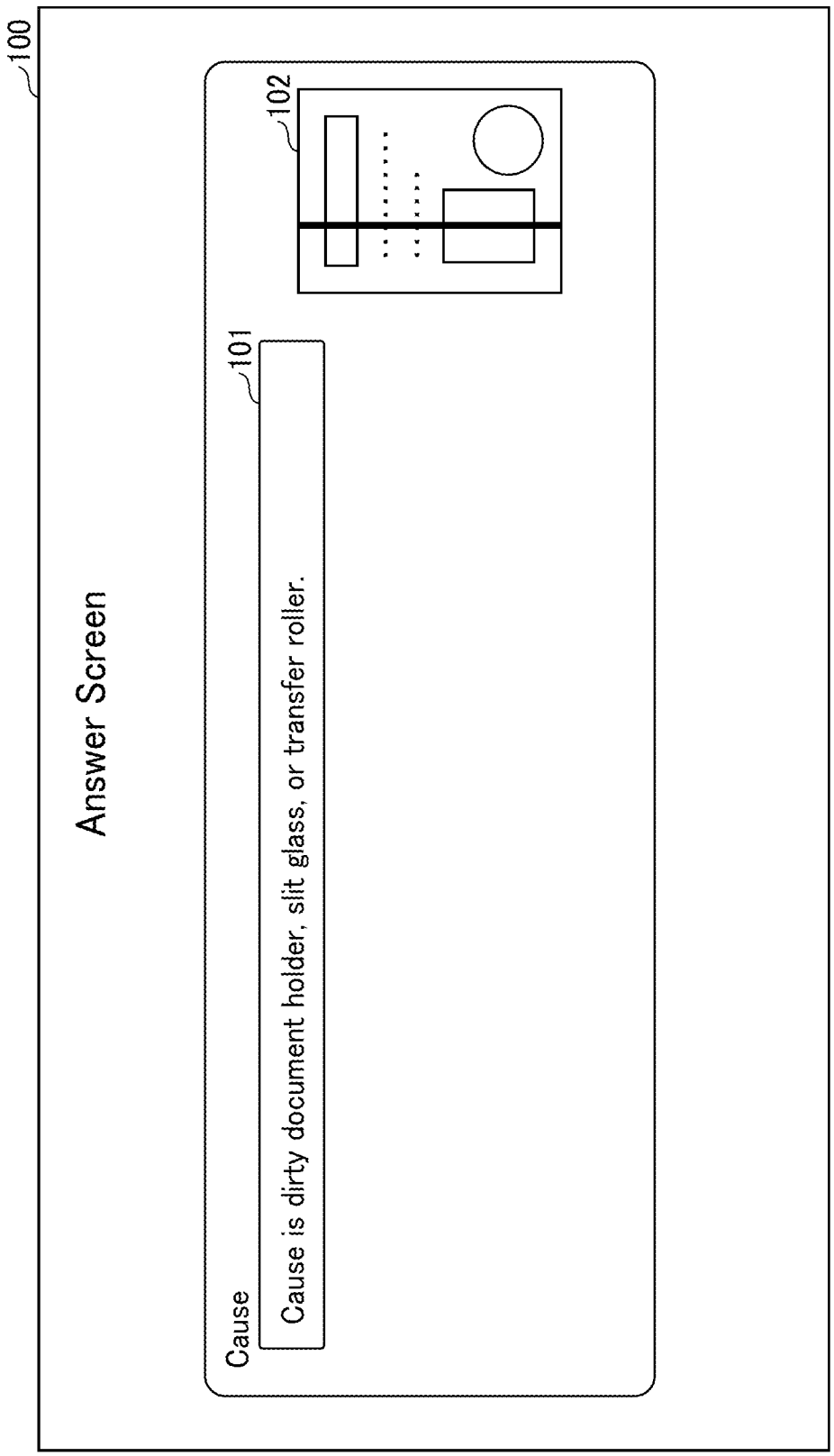
FIG. 15 is a diagram illustrating a second example of the answer screen according to the embodiments of the present disclosure.

Another example of the answer screen is described in the following. FIG. 15 is a diagram illustrating a second example of the answer screen according to the embodiments of the present disclosure. The answer screen 100 in FIG. 15 is the screen displayed in step S40. The answer screen 100 includes a cause display field 101.

In the cause display field 101, as a possible failure due to problem related to the search input, a description indicating the causes included in the corresponding document information, "This is because the document holder, slot glass, or transfer roller is dirty." is displayed.

Figure 16:
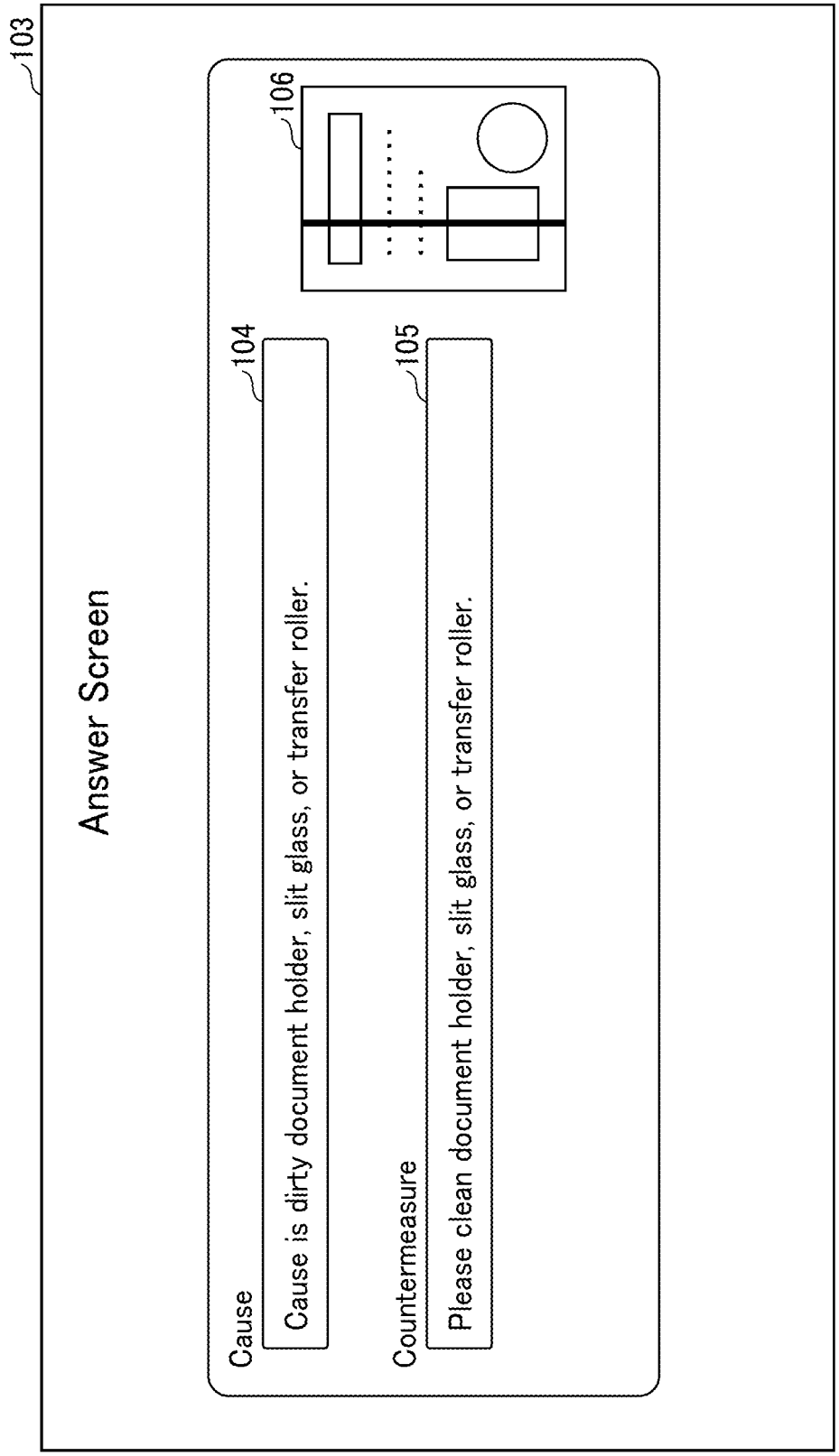
FIG. 16 is a diagram illustrating a third example of the answer screen according to the embodiments of the present disclosure.

Furthermore, an example of another answer screen is described. FIG. 16 is a diagram illustrating a third example of the answer screen according to the embodiments of the present disclosure. The answer screen 103 in FIG. 16 is the screen displayed in step S40. The answer screen 103 includes a cause display field 104 and a countermeasure display field 105.

In the display field 104, for possible failure due to problem related to the search input, a description indicating the causes included in the corresponding document information, "Dirty document holder, slot glass, transfer roller." is displayed.

In the countermeasure display field 105, as a countermeasure included in the document information for the causes indicated in the cause display field 104, a description "Please clean the document holder, slot glass and transfer roller." is displayed.

Furthermore, an example of another answer screen is described in the following. FIG. 17 is a diagram illustrating a fourth example of the answer screen according to the embodiments of the present disclosure. The answer screen 107 in FIG. 17 is the screen displayed in step S40. On the answer screen 107, as a countermeasure included in the corresponding document information, a description "Please clean the document holder, the slot glass, and the transfer roller." is displayed.

Figure 18:
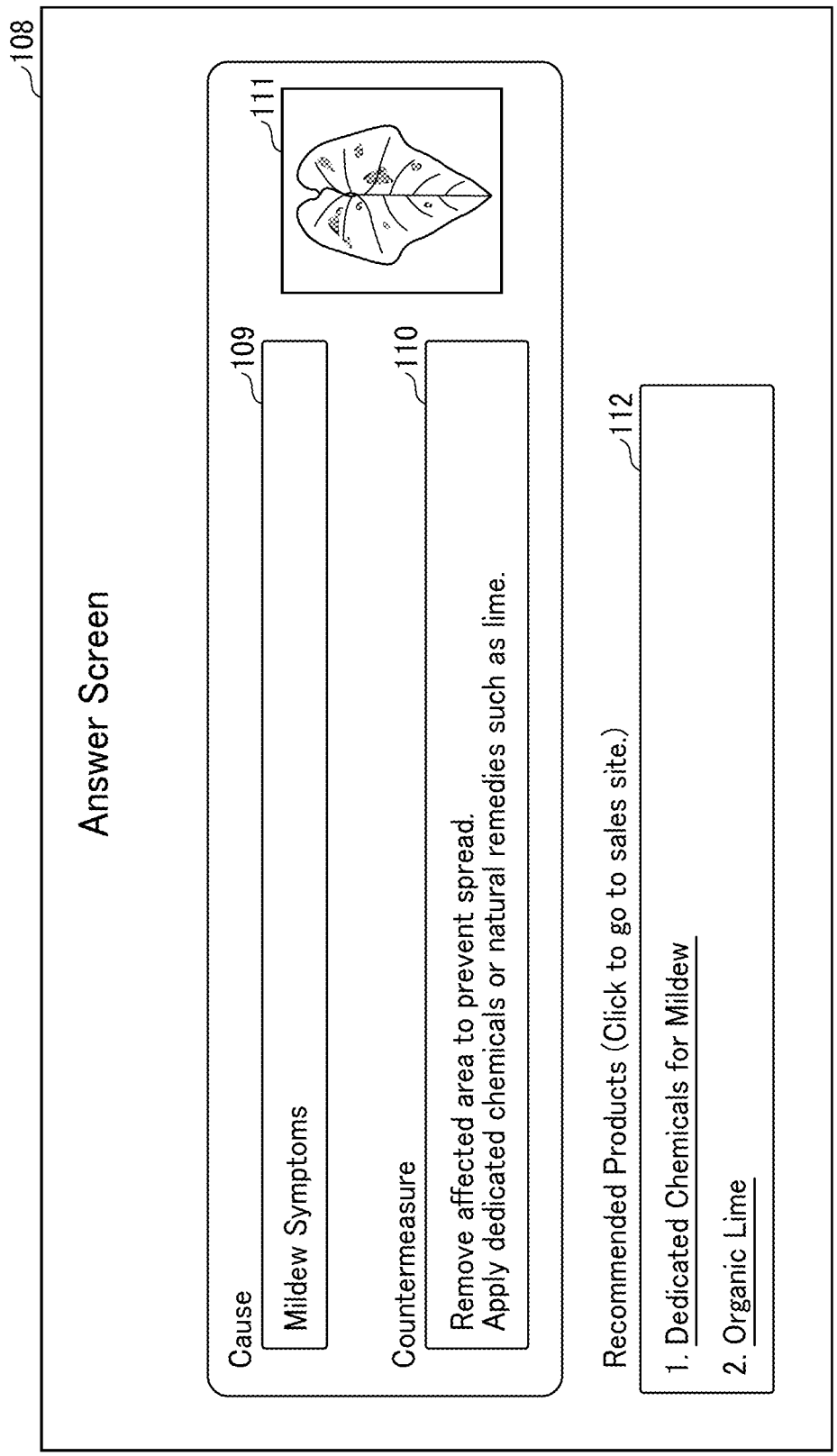
FIG. 18 is a diagram illustrating a fifth example of the answer screen according to the embodiments of the present disclosure.

Furthermore, an example of another answer screen is described in the following. FIG. 18 is a diagram illustrating a fifth example of the answer screen according to the embodiments of the present disclosure. The answer screen 108 in FIG. 18 is the screen displayed in step S40. The answer screen 108 includes a cause display field 109, a countermeasure display field 110, a related image 111 and a recommendation display field 112.

In the cause display field 109, as the cause included in the document information corresponding to the problem related to the search input, a description "Symptom of powdery mildew." is displayed.

In the countermeasure display field 110, as countermeasures included in the document information for the cause indicated in the cause display field 109, a description "Remove the affected part to stop the spread. Apply dedicated chemicals or natural remedies such as lime." is displayed.

The related image 111 is an image related to the description.

The recommendation display field 112 displays a link to a web site that sells a countermeasure drug or the like as information on supplies used to improve the "symptom of powdery mildew" that is the cause displayed in the cause display field 109.

In step S33, in the case the specifying unit 15 of the information processing apparatus 2 specifies that the number of modes is one, the list screen transmission unit 11 of the information processing apparatus 2 does not transmit the screen information of the search result list screen. Instead of the processing from step S34 to step S40, the processing from step S41 to step S43 described below is executed.

In step S41, the generation unit 16 of the information processing apparatus 2 generates the description information including the description included in the document information stored in the storage unit 18 of the information processing apparatus 2 in association with the state information in the mode specified by the specifying unit 15 of the information processing apparatus 2 in step S32. Furthermore, the generation unit 16 generates the screen information for displaying the description information.

In step S42, the description information transmission unit 13 of the information processing apparatus 2 transmits the screen information including the description information generated by the generation unit 16 in step S41 to the reception unit 23 of the communication terminal 5.

In step S43, the display control unit 20 of the communication terminal 5 causes the display unit 25 of the communication terminal 5 to display the description information based on the screen information received by the reception unit 23 of the communication terminal 5.

Figure 19:
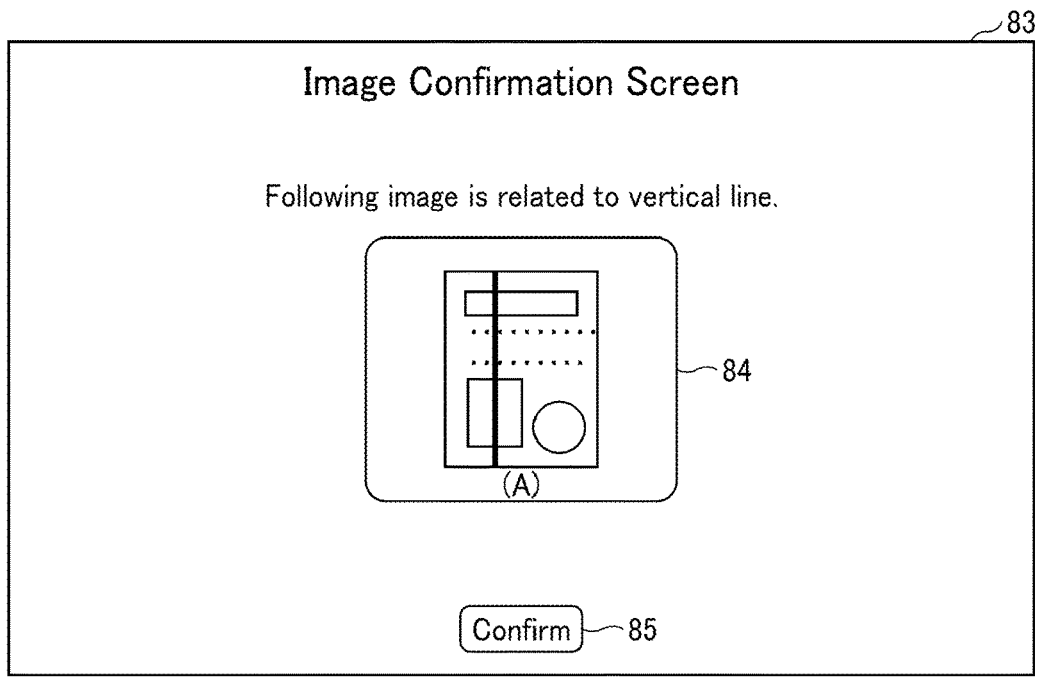
FIG. 19 is a diagram illustrating an example of an image confirmation screen according to the embodiments of the present disclosure.

Alternatively, the processing from step S41 to step S43 may be executed after the user confirmed an image confirmation screen displaying the image or video corresponding to one mode, similar to the search result list screen displayed in step S36 for the multiple modes, even in the case mode is singular. In other words, even when the number of modes is one, the same processing as in steps S34 to S37 is executed, and in step S36, the image confirmation screen displaying the image or video corresponding to one mode is displayed. FIG. 19 is a diagram illustrating an example of the image confirmation screen according to the embodiment of the present disclosure. An image confirmation screen 83 of FIG. 19 is a screen displayed in step S36 in the case the number of modes is one. The image confirmation screen 83 includes an image display area 84 and a confirmation button 85.

An image corresponding to the mode is displayed in the image display area 84.

The confirmation button 85 is a button for the user to press after confirming the image.

According to the process described in the flowchart of FIG. 7 above, in the information processing system 1, in response to the user performing the search for the predetermined state, the search result desired by the user can be confirmed by the image or video from the search result list.

Figure 20:
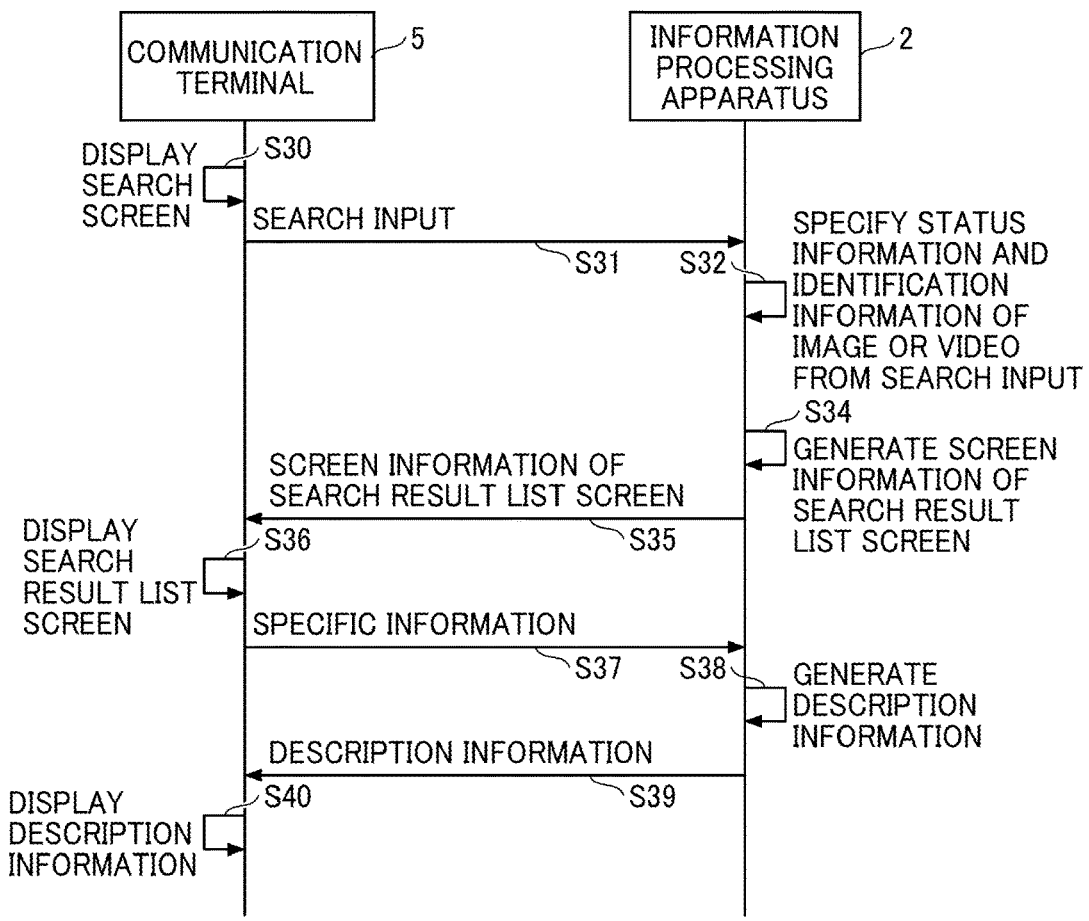
FIG. 20 is a sequence diagram illustrating a first modified example of the search response process according to the embodiments of the present disclosure.

A first modified example of the search response process is described with respect to the differences from the process illustrated in the sequence diagram of FIG. 7. FIG. 20 is a sequence diagram illustrating the first modified example of the search response process according to the embodiments of the present disclosure. In this process, regardless of whether the number of modes of the state information to be specified is singular or plural based on the search input by the user, the information processing apparatus 2 transmits the screen information of the search result list screen to the communication terminal 5.

Figure 21:
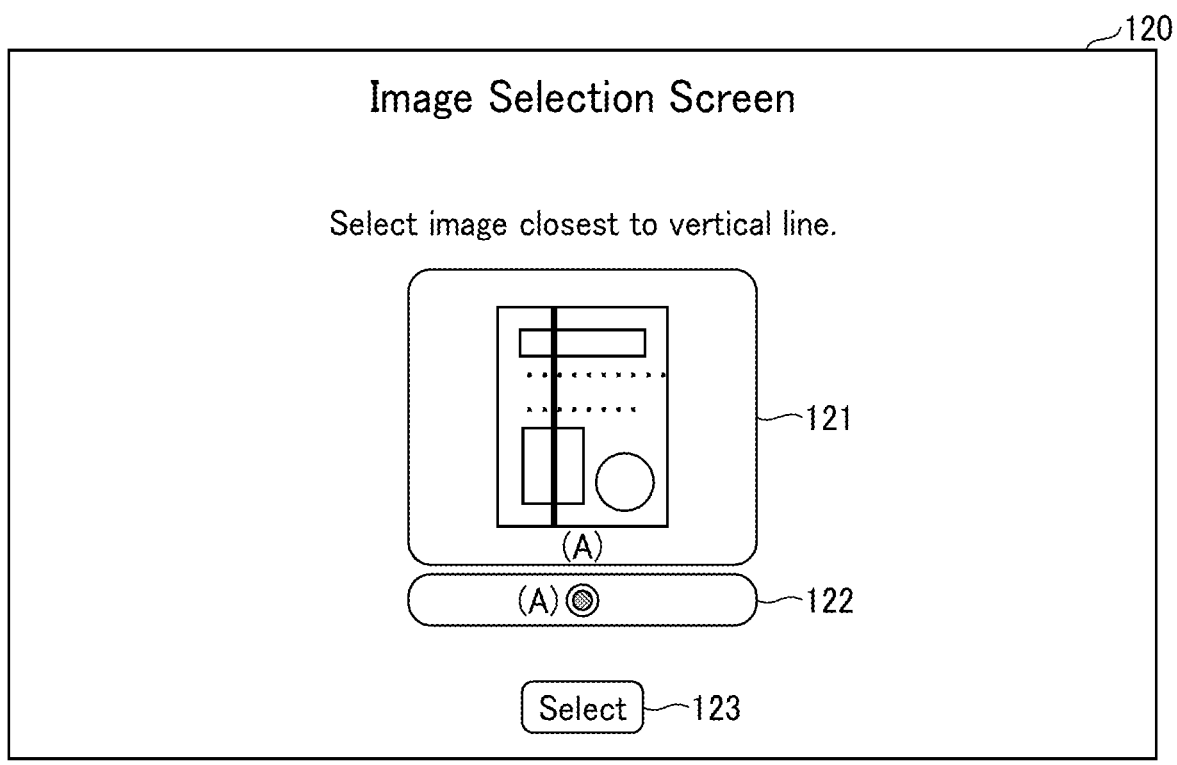
FIG. 21 is a diagram illustrating a third example of the image selection screen according to the embodiments of the present disclosure.

That is, the process of specifying the number of modes of the state information, which is performed in step S33 of FIG. 7, is not performed in the first modification as illustrated in FIG. 20. There is no branching of the process and no process control for the plural and singular cases. In the case the number of modes is one, the screen information of the search result list screen for the user to select the image or video corresponding to the search input is transmitted to the communication terminal 5, as in the case of multiple modes. FIG. 21 is a diagram illustrating a second example of the image selection screen according to the embodiments of the present disclosure. The image selection screen 120 of FIG.

21 includes the image display area 121, the select button 122, and the select button 123.

Number of candidates of the image to be selected by the user displayed in the image display area 121 is one.

Similarly, for the selection button 122, one button for selecting the candidate is displayed.

The select button 89 is a button to be pressed for the user to select the image by pressing the selection button 122 and then instructs to select the image.

Also, in the processing according to the first modified example, in the information processing system 1, in response to the user performing the search for the predetermined state, the search result desired by the user can be confirmed by the image or video from the search result list.

A second modified example of performing the search response process using the sound is described with respect to points different from the process illustrated in the sequence diagram of FIG. 7. FIG. 22 is a diagram illustrating the third example of the database according to the embodiments of the present disclosure. The search target information stored in the database 53 of FIG. 22 includes key, cause, countermeasure, image information, and countermeasure related site as information items.

The value of the item "key" is the state information indicating the predetermined state of the object (image forming apparatus), and includes, for example, keywords relating to the state of image forming apparatus such as "noise" and "paper jam".

The value of the item "cause" is information indicating the document information indicating the mode in the predetermined state indicated by the value of the item "key", and includes, for example, the description describing the cause of the mode, such as "paper jam", "roller damaged", and "heater failure".

The value of the item "countermeasure" is information indicating the document information indicating the mode in the predetermined state indicated by the value of the item "key", and includes the description of the countermeasure for the mode.

The value of the item "sound information" is information indicating identification information for identifying the sound that aurally expresses the mode of the predetermined state indicated by the value of the item "key", and is the file name of the sound file in this example.

The value of the item "countermeasure-related site" includes the URL where manuals and contact information related to the countermeasures for the predetermined state indicated by the value of the item "key" are posted.

Figure 23:
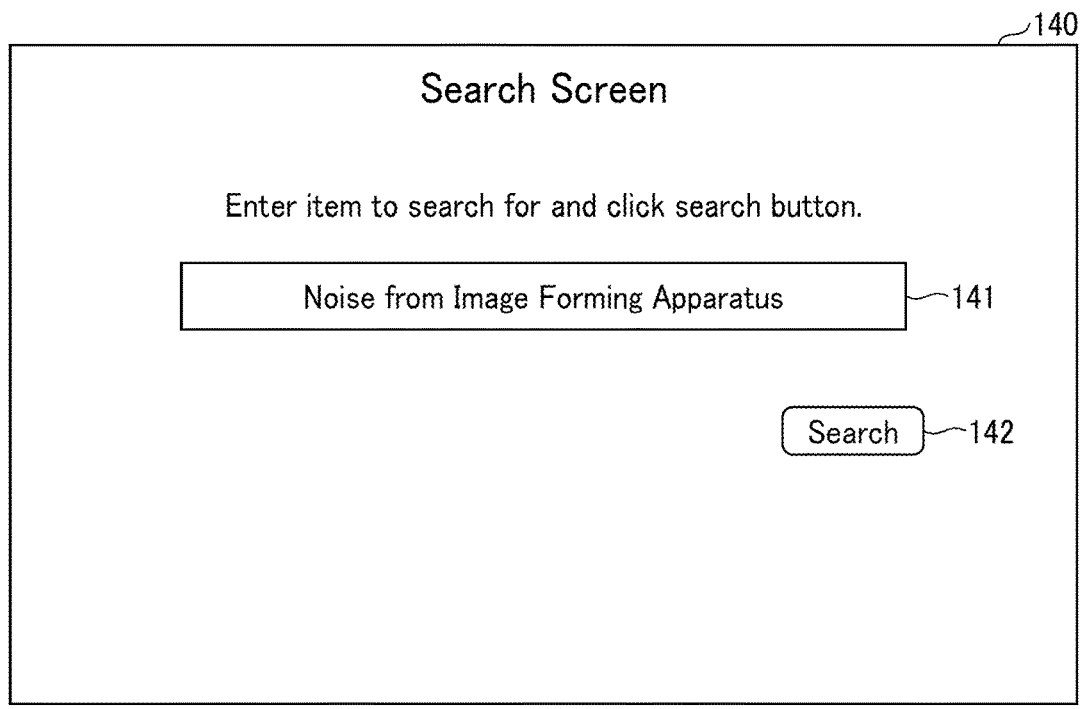
FIG. 23 is a diagram illustrating a fifth example of the search screen according to the embodiments of the present disclosure.

In the second modification, in step S30 of FIG. 7, the operation reception unit 24 of the communication terminal 5 receives, for example, the search input by the user regarding abnormal noise of the image forming apparatus. FIG. 23 is a diagram illustrating a fifth example of the search screen according to the embodiments of the present disclosure. A search input field 141 and a search button 142 are displayed on a search screen 140 of FIG. 23.

The search input field 141 is a field in which the user inputs the search input by characters, words, sentences, and the like, and "an abnormal noise is coming from the image forming apparatus" is entered as the search input in this example.

The search button 142 is a button for the user to press for starting the search after completing the search input.

Figure 24:
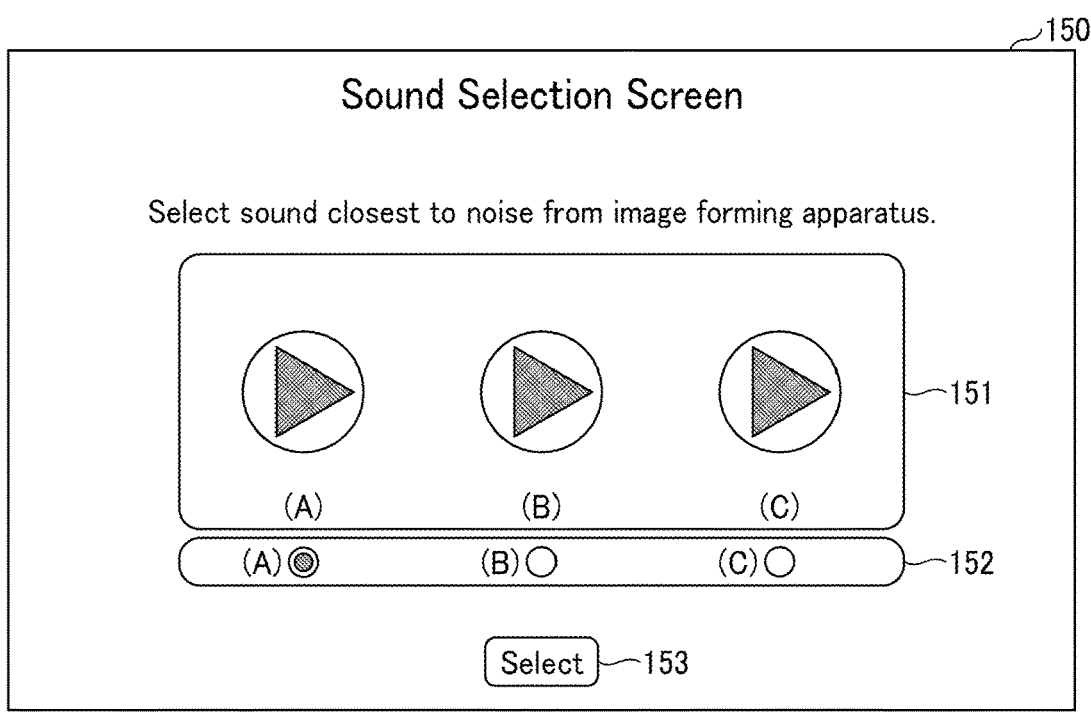
FIG. 24 is a diagram illustrating an example of a sound selection screen according to the embodiments of the present disclosure.

Further, in the second modification, in step S33 of FIG. 7, the generation unit 16 of the information processing apparatus 2 generates the screen information of the search result list screen for displaying the sound identified by the identification information specified by the specifying unit 15 in step S31 in a reproducible and selectable manner. FIG. 24 is a diagram illustrating an example of a sound selection screen according to the embodiment of the present disclosure. The sound selection screen 150 of FIG. 24 includes a sound selection area 151, the selection buttons 152, and the select button 153.

In the sound selection area 151, buttons are displayed to play sounds corresponding to "paper jam," "roller damage," and "heater failure" which are three modes indicated by the value of the item "cause" corresponding to the value of the item "key" in the database 53 of FIG. 22.

The selection buttons 152 are buttons for the user to select the sound corresponding to the mode related to the search input.

The select button 153 is a button for the user to press for instructing to select the sound after pressing the selection button 152 to select the sound.

According to the above process, in the information processing system 1, when the user searches for the predetermined state, the search result desired by the user can be confirmed by the sound from the list of search results.

The above-described embodiments are illustrative and do not limit the present disclosure. For example, elements and/or features of different illustrative embodiments may be combined with each other and/or substituted for each other within the scope of the present disclosure. Thus, numerous additional modifications and variations are possible in light of the above teachings.

For example, the functional block diagrams of FIG. 3 is divided according to the main functions in order to facilitate understanding of the processing by the information processing apparatus 2 and the communication terminal 5 that implements the information processing system 1. The present disclosure is not limited by the method and name of division of processing units. The processing in the information processing apparatus 2 and the communication terminal 5 included in the information processing system 1 can also be divided into more processing units according to the content of the processing. Further, one process may be divided to include a larger number of processes.

The apparatuses described are merely an illustration of one of several computing environments for implementing the embodiments disclosed herein. In one embodiment, the information processing apparatus 2 and the communication terminal 5 included in the information processing system 1 include a plurality of computing devices such as server clusters. The plurality of computing devices is configured to communicate with one another through any type of communication link, including a network, shared memory, etc., and perform the processes disclosed herein.

Aspects of the present disclosure are, for example, as follows.

According to a first aspect, an information processing apparatus communicably connected to a communication terminal through a network includes, a storage unit for storing state information indicating a predetermined state for each predetermined state of an object, identification information for identifying an image or video that visually represents at least one mode of the predetermined state, and document information including a description describing the at least one mode represented by the information of the image or video in association with each other, an input reception unit for receiving from the communication terminal through the network, a search input entered at the communication terminal, a list screen transmission unit that transmits to the communication terminal through the network, first screen information of a search result list screen to be displayed in a selectable manner, indicating an image or video identified by the identification information of the image or video stored in the storage unit in association with the state information specified based on the input, a specific information reception unit for receiving from the communication terminal through the network, specific information for specifying an image or video selected by a user from among the images or videos displayed in the selectable manner on the search result list screen, a generation unit for generating description information including part or all of a description included in the document information stored in the storage unit in association with identification information for identifying the image or video specified based on the specific information, and a description information transmission unit for transmitting the description information to the communication terminal through the network.

According to a second aspect, in the information processing apparatus of the first aspect, in a case there are a plurality of modes in the predetermined state, the identification information for identifying the image or video stored in the storage unit includes at least first identification information for identifying a first image or video that visually represents a first mode in the predetermined state, and second identification information for identifying a second image or video visually representing a second mode different from the first mode, and the document information stored in the storage unit includes first document information including at least a first description describing the first mode, and second document information including at least a second description describing the second mode, and in the case there are the plurality of modes in the predetermined state, the search result list screen is a screen for displaying in a selectable manner, a plurality of images or videos corresponding to each of the plurality of modes including at least the first image or video identified by the first identification information and the second image or video identified by the second identification information.

According to a third aspect, in the information processing apparatus of the first aspect or the second aspect, in a case there is one mode in the state information stored in a storage unit in association with the state information specified based on the input received by an input reception unit, the list screen transmission unit does not transmit screen information of the search result list screen to the communication terminal, and the generation unit generates the description information including part or all of the description included in the document information stored in association with the one mode in the state information.

According to a fourth aspect, in the information processing apparatus of any one of the first aspect to the third aspect, the description describing at least one mode includes at least one of a text describing a cause of the at least one mode, a text describing countermeasure, or a text describing the mode in detail.

According to a fifth aspect, in the information processing apparatus of any one of the first aspect to the fourth aspect, the generation unit generates second screen information for a description screen including at least display of the description information, and the description information transmission unit transmits the generated second screen information to the communication terminal through the network.

According to a sixth aspect, in the information processing apparatus of the fifth aspect, the description screen further includes a display of the search input received by the input reception unit.

According to a seventh aspect, in the information processing apparatus of the fifth aspect or the sixth aspect, the description screen indicates, by symbols, sentences or words that have a causal relationship with the sentences or words related to the state information, among the sentences or words that are displayed in the search input display, and in addition, among the sentences or words displayed in the display of the description information, a sentence or word that has a causal relationship with the sentences or words related to the state information included in the description is indicated by the symbols.

According to an eighth aspect, in the information processing apparatus of any one of the fifth aspect to the seventh aspect, the first screen information and the second screen information are web content data that can be displayed by a web browser application or an application including a web browser function.

According to a ninth aspect, in the information processing apparatus of any one of the fifth aspect to the eighth aspect, the description screen includes at least a display of information on one or more articles used to improve the predetermined state.

According to a tenth aspect, in the information processing apparatus of the ninth aspect, the description screen includes a link to a website that provides or sells the one or more articles.

According to an eleventh aspect, in the information processing apparatus of any one of the first aspect to the tenth aspect, in a case there are a plurality of images or videos stored in the storage unit in association with the state information, the information processing apparatus further includes an extraction unit that classifies the plurality of images or videos having a similarity higher than a threshold into the same group and extracts one image or video for each group, and displays the extracted image or video in a selectable manner on the search result list screen.

According to a twelfth aspect, in the information processing apparatus of any one of the first aspect to the eleventh aspect, the search input for the predetermined state is an input received through a third screen on which the state information indicating the predetermined state is displayed in a selectable manner.

According to a thirteenth aspect, in the information processing apparatus of any one of the first aspect to the twelfth aspect, the search input for the predetermined state is input by a natural sentence or keyword.

According to a fourteenth aspect, in the information processing apparatus of any one of the first aspect to the thirteenth aspect, the object is an image forming apparatus, and the predetermined state is a state of malfunction in the image forming apparatus.

According to a fifteenth aspect, in the information processing apparatus of any one of the first aspect to the thirteenth aspect, the object includes living things, actions by living things, natural phenomena, chemical phenomena, goods, real estate, software, devices, and actions by devices.

The embodiments of the present disclosure describe an information processing apparatus communicably connected to a communication terminal through a network, comprising circuitry configured to store in one or more memories, for each predetermined state of an object, state information indicating a predetermined state of the object, identification information for identifying a sound that aurally represents at least one mode of the predetermined state, and document information including a description describing at least one mode represented by the information of the sound in association with each other, receive from the communication terminal through the network, a search input entered at the communication terminal, transmit to the communication terminal through the network, first screen information of a search result list screen to be displayed in a selectable manner, the first screen information indicating the sound identified by the identification information of the sound stored in the one or more memories in association with the state information specified based on the input, receive from the communication terminal through the network, specific information for specifying one sound selected by a user from among the sound displayed in the selectable manner on the search result list screen, generate description information including part or all of a description included in the document information stored in the one or more memories in association with identification information for identifying the sound specified based on the specific information, and transmit the generated description information to the communication terminal through the network.

The embodiments of the present disclosure describe an information processing method executed by an information processing apparatus communicably connected to a communication terminal through a network, the method comprising, storing state information indicating a predetermined state for each predetermined state of an object, identification information for identifying a sound that aurally represents at least a mode of the predetermined state, and document information including a description describing at least one mode represented by the information of the sound in association with each other, receiving from the communication terminal through the network, a search input entered at the communication terminal, transmitting to the communication terminal through the network, first screen information of a search result list screen to be displayed in a selectable manner, the first screen information indicating the sound identified by the identification information of the sound stored in one or more memories in association with the state information specified based on the input, receiving from the communication terminal through the network, specific information for specifying one sound selected by a user from among the sounds displayed in the selectable manner on the search result list screen, generating description information including a part or all of a description included in the document information stored in the one or more memories in association with identification information for identifying the sound specified based on the specific information, and transmitting the description information to the communication terminal through the network.

The embodiments of the present disclosure describe an information processing system comprising a communication terminal and an information processing apparatus connected through a network, the information processing apparatus including, store in one or more memories, state information indicating a predetermined state for each predetermined state of an object, identification information for identifying a sound that aurally represents at least a mode of the predetermined state, and document information including a description describing at least one mode represented by the information of the sound in association with each other, receive from the communication terminal through the network, a search input entered at the communication terminal, transmit to the communication terminal through the network, first screen information of a search result list screen to be displayed in a selectable manner, indicating the sound identified by the identification information of the sound stored in the one or more memories in association with the state information specified based on the input, receive from the communication terminal through the network, specific information for specifying one sound selected by a user from among the sound displayed in a selectable manner on the search result list screen, generate second screen information for a description screen including description information including a part or all of a description included in the document information stored in the one or more memories in association with identification information for identifying the one sound specified based on the specific information, and transmit the second screen information to the communication terminal through the network, and the communication terminal including circuitry configured to in response to receiving the search input, transmit the search input to the information processing apparatus through the network, in response to receiving the first screen information from the information processing apparatus, display the search result list screen on a display based on the first screen information, transmit to the information processing apparatus through the network, specific information for specifying one image or video selected by the user from among the images or videos displayed in a selectable manner on the search result list screen, and in response to receiving the second screen information from the information processing apparatus, display the description screen on the display based on the second screen information.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus communicably connected to a communication terminal through a network, comprising:
    one or more memories that store state information indicating a predetermined state of a problem that occurs in an object, the predetermined state including a first mode and a second mode,
    store the state information in association with first identification information for identifying a first image that visually represents the first mode of the predetermined state, and first document information including a first description describing a cause of the first mode represented by the first image, and store the state information in association with second identification information for identifying a second image that visually represents the second mode of the predetermined state, and second document information including a second description describing a cause of the second mode represented by the second image; and circuitry configured to:

receive from the communication terminal through the network, a text entered by a user at the communication terminal;

specify the first image identified by the first identification information and the second image identified by the second identification information stored in association with the state information based on the entered text;

transmit to the communication terminal through the network, first screen information of a selection screen including the first image and the second image specified;

cause the communication terminal to display the first image and the second image specified in a selectable manner, together with the text entered by the user, on the selection screen where the user selects from the first image and the second image;

receive from the communication terminal through the network, first specific information for specifying the first image when the user selects the first image on the selection screen, and second specific information for specifying the second image when the user selects the second image on the selection screen;

in response to receiving the first specific information for specifying the first image, generate first description information including a part or all of the first description describing the cause of the first mode based on the first specific information for specifying the first image selected by the user on the selection screen, and transmit the first description information to the communication terminal through the network; and in response to receiving the second specific information for specifying the second image, generate second description information including a part or all of the second description describing the cause of the second mode based on the second specific information for specifying the second image selected by the user on the selection screen, and transmit the second description information to the communication terminal through the network.

2. The information processing apparatus of claim 1, wherein the first description describing the cause of the first mode or the second description describing the cause of the second mode further includes a text describing countermeasure, or a text describing the mode in detail.

3. The information processing apparatus of claim 1, wherein the circuitry is further configured to:

generate second screen information for a description screen including at least a display of the first description information or the second description information; and transmit the generated second screen information to the communication terminal through the network.

4. The information processing apparatus of claim 3, wherein the description screen further includes a display of the entered text.

5. The information processing apparatus of claim 4, wherein the circuitry is further configured to:

indicate by symbols, sentences or words that have a causal relationship with the sentences or words related to the state information, among the sentences or words that are displayed in the entered text; and indicate by the symbols, sentences or words that have the causal relationship with the sentences or words related to the state information included in the first description or the second description among the sentences or words displayed in the display of the first description information or the second description information.

6. The information processing apparatus of claim 3, wherein the first screen information and the second screen information are web content data that is displayed by a web browser application or an application including a web browser function.

7. The information processing apparatus of claim 3, wherein the description screen includes at least a display of information on one or more articles used to improve the predetermined state.

8. The information processing apparatus of claim 7, wherein the description screen includes a link to a website that provides or sells the one or more articles.

9. The information processing apparatus of claim 1, wherein in a case in which the first image or the second image includes a plurality of images, the circuitry is further configured to:

classify the plurality of images having a similarity higher than a threshold into a same group and extract one image for each group; and display the extracted image in a selectable manner on the selection screen.

10. The information processing apparatus of claim 1, wherein the entered text is an input received through a third screen on which the state information indicating the predetermined state is displayed in a selectable manner.

11. The information processing apparatus of claim 1, wherein the entered text is input by a natural sentence or keyword.

12. The information processing apparatus of claim 1, wherein the object is an image forming apparatus, and the predetermined state is a state of malfunction in the image forming apparatus.

13. The information processing apparatus of claim 1, wherein the object includes living things, actions by living things, natural phenomena, chemical phenomena, goods, real estate, software, devices, and actions by devices.

14. An information processing method executed by an information processing apparatus communicably connected to a communication terminal through a network, the information processing apparatus including one or more memories that store state information indicating a predetermined state of a problem that occurs in an object, the predetermined state including a first mode and a second mode, store the state information in association with first identification information for identifying a first image that visually represents the first mode of the predetermined state, and first document information including a first description describing a cause of the first mode represented by the first image, and store the state information in association with second identification information for identifying a second image that visually represents the second mode of the predetermined state, and second document information including a second description describing a cause of the second mode represented by the second image, the method comprising:

receiving from the communication terminal through the network, a text entered by a user at the communication terminal;

specifying the first image identified by the first identification information and the second image identified by the second identification information stored in association with the state information based on the entered text;

transmitting to the communication terminal through the network, first screen information of a selection screen including the first image and the second image specified;

causing the communication terminal to display the first image and the second image specified in a selectable manner, together with the text entered by the user, on the selection screen where the user selects from the first image and the second image;

receiving from the communication terminal through the network, first specific information for specifying the first image when the user selects the first image on the selection screen, and second specific information for specifying the second image when the user selects the second image on the selection screen;

in response to receiving the first specific information for specifying the first image, generating first description information including a part or all of the first description describing the cause of the first mode based on the first specific information for specifying the first image selected by the user on the selection screen, and transmitting the first description information to the communication terminal through the network; and in response to receiving the second specific information for specifying the second image, generating second description information including a part or all of the second description describing the cause of the second mode based on the second specific information for specifying the second image selected by the user on the selection screen, and transmitting the second description information to the communication terminal through the network.

15. An information processing system comprising a communication terminal and the information processing apparatus of claim 1, the communication terminal including:
circuitry configured to:
in response to receiving the entered text, transmit the entered text to the information processing apparatus through the network;

in response to receiving the first screen information from the information processing apparatus, display the selection screen on a display based on the first screen information;

transmit to the information processing apparatus through the network, the first specific information for specifying the first image or the second specific information for specifying the second image selected by the user on the selection screen; and in response to receiving second screen information from the information processing apparatus, display the description screen on the display based on the second screen information.

16. A non-transitory recording medium storing a plurality of instructions which, when executed by one or more processors, cause the processors to perform an information processing method executed by an information processing apparatus communicably connected to a communication terminal through a network, the information processing apparatus including one or more memories that store state information indicating a predetermined state of a problem that occurs in an object, the predetermined state including a first mode and a second mode, store the state information in association with first identification information for identifying a first image that visually represents the first mode of the predetermined state, and first document information including a first description describing a cause of the first mode represented by the first image or video, and store the state information in association with second identification information for identifying a second image that visually represents the second mode of the predetermined state, and second document information including a second description describing a cause of the second mode represented by the second image, the method comprising:

receiving from the communication terminal through the network, a text entered by a user at the communication terminal;

specifying the first image identified by the first identification information and the second image identified by the second identification information stored in association with the state information based on the entered text;

transmitting to the communication terminal through the network, first screen information of a selection screen including the first image and the second image specified;

causing the communication terminal to display the first image and the second image specified in a selectable manner, together with the text entered by the user, on the selection screen where the user selects from the first image and the second image;

receiving from the communication terminal through the network, first specific information for specifying the first image when the user selects the first image on the selection screen, and second specific information for specifying the second image when the user selects the second image on the selection screen;

in response to receiving the first specific information for specifying the first image, generating first description information including a part or all of the first description describing the cause of the first mode based on the first specific information for specifying the first image selected by the user on the selection screen, and transmitting the first description information to the communication terminal through the network; and in response to receiving the second specific information for specifying the second image, generating second description information including a part or all of the second description describing the cause of the second mode based on the second specific information for specifying the second image selected by the user on the selection screen, and transmitting the second description information to the communication terminal through the network.

* * * * *